(12) United States Patent
Leone et al.

(10) Patent No.: US 8,267,074 B2
(45) Date of Patent: Sep. 18, 2012

(54) CONTROL FOR KNOCK SUPPRESSION FLUID SEPARATOR IN A MOTOR VEHICLE

(75) Inventors: Thomas G. Leone, Ypsilanti, MI (US); Donald J. Lewis, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 12/145,110

(22) Filed: Jun. 24, 2008

(65) Prior Publication Data

US 2008/0288158 A1 Nov. 20, 2008

Related U.S. Application Data

(63) Continuation-in-part of application No. 11/384,111, filed on Mar. 17, 2006, now Pat. No. 7,389,751.

(51) Int. Cl.
*F02B 13/00* (2006.01)
(52) U.S. Cl. ............... 123/575; 123/1 A; 123/3
(58) Field of Classification Search ............. 123/1 A, 123/3, 304, 575–578, 514, 461
See application file for complete search history.

(56) References Cited

U.S. PATENT DOCUMENTS

| | | | |
|---|---|---|---|
| 2,221,405 A | 11/1940 | Nallinger | |
| 3,589,348 A | 6/1971 | Reichhelm | |
| 3,794,000 A | 2/1974 | Hodgkinson | |
| 3,826,234 A * | 7/1974 | Cinquegrani | 123/446 |
| 4,031,864 A * | 6/1977 | Crothers | 123/1 A |
| 4,136,652 A | 1/1979 | Lee | |
| 4,205,650 A | 6/1980 | Szwarcbier | |
| 4,256,075 A | 3/1981 | Fukui et al. | |
| 4,311,118 A | 1/1982 | Slagle | |
| 4,325,329 A | 4/1982 | Taylor | |
| 4,331,121 A | 5/1982 | Stokes | |
| 4,402,296 A | 9/1983 | Schwarz | |
| 4,411,243 A | 10/1983 | Hardenberg et al. | |
| 4,480,616 A | 11/1984 | Takeda | |
| 4,489,596 A | 12/1984 | Linder et al. | |
| 4,495,930 A | 1/1985 | Nakajima | |
| 4,502,453 A | 3/1985 | Kabasin et al. | |
| 4,558,665 A | 12/1985 | Sandberg et al. | |
| 4,590,904 A | 5/1986 | Wannenwetsch | |
| 4,648,367 A | 3/1987 | Gillbrand et al. | |
| 4,706,630 A | 11/1987 | Wineland et al. | |
| 4,810,929 A | 3/1989 | Strumbos | |

(Continued)

FOREIGN PATENT DOCUMENTS

EP 1057988 1/2006

(Continued)

OTHER PUBLICATIONS

U.S. Appl. No. 60/780,319, filed Mar. 8, 2006, Bromberg et al.

(Continued)

*Primary Examiner* — Mahmoud Gimie
*Assistant Examiner* — David Hamaoui
(74) *Attorney, Agent, or Firm* — Julia Voutyras; Alleman Hall McCoy Russell & Tuttle LLP

(57) ABSTRACT

A fuel system for an engine of a vehicle and a method of operating the fuel system are described. As a non-limiting example, the fuel system is controlled in response to engine operating conditions.

11 Claims, 20 Drawing Sheets

U.S. PATENT DOCUMENTS

| | | | |
|---|---|---|---|
| 4,817,576 A | 4/1989 | Abe et al. | |
| 4,930,537 A | 6/1990 | Farmer | |
| 4,945,881 A | 8/1990 | Gonze et al. | |
| 4,962,789 A | 10/1990 | Benscoter | |
| 4,993,386 A | 2/1991 | Ozasa et al. | |
| 4,998,518 A | 3/1991 | Mitsumoto | |
| 5,017,826 A | 5/1991 | Oshima et al. | |
| 5,018,483 A | 5/1991 | Kashima et al. | |
| 5,044,331 A | 9/1991 | Suga et al. | |
| 5,044,344 A | 9/1991 | Tuckey et al. | |
| 5,056,490 A | 10/1991 | Kashima | |
| 5,056,494 A | 10/1991 | Kayanuma | |
| 5,060,610 A | 10/1991 | Paro | |
| 5,111,795 A | 5/1992 | Thompson | |
| 5,131,228 A | 7/1992 | Mochizuki et al. | |
| 5,174,247 A | 12/1992 | Tosa et al. | |
| 5,188,087 A | 2/1993 | Saito | |
| 5,193,508 A * | 3/1993 | Motoyama et al. | 123/460 |
| 5,204,630 A | 4/1993 | Seitz et al. | |
| 5,230,309 A | 7/1993 | Suga et al. | |
| 5,233,944 A | 8/1993 | Mochizuki | |
| 5,335,637 A | 8/1994 | Davis et al. | |
| 5,336,396 A | 8/1994 | Shetley | |
| 5,357,908 A | 10/1994 | Sung et al. | |
| 5,360,034 A | 11/1994 | Der Manuelian | |
| 5,408,979 A | 4/1995 | Backlund et al. | |
| 5,417,239 A | 5/1995 | Ford | |
| 5,469,830 A | 11/1995 | Gonzalez | |
| 5,477,836 A | 12/1995 | Hyodo et al. | |
| 5,508,582 A | 4/1996 | Sugimoto et al. | |
| 5,565,157 A | 10/1996 | Sugimoto et al. | |
| 5,694,908 A | 12/1997 | Hsu | |
| 5,740,784 A | 4/1998 | McKinney | |
| 5,782,092 A | 7/1998 | Schultalbers et al. | |
| 5,806,500 A | 9/1998 | Fargo et al. | |
| 5,875,743 A | 3/1999 | Dickey | |
| 5,887,566 A | 3/1999 | Glauber et al. | |
| 5,921,222 A | 7/1999 | Freeland | |
| 6,035,837 A * | 3/2000 | Cohen et al. | 123/575 |
| 6,112,705 A | 9/2000 | Nakayama et al. | |
| 6,112,725 A | 9/2000 | McKinney | |
| 6,119,637 A | 9/2000 | Matthews et al. | |
| 6,189,516 B1 | 2/2001 | Hei Ma | |
| 6,213,086 B1 | 4/2001 | Chmela et al. | |
| 6,229,253 B1 | 5/2001 | Iwata et al. | |
| 6,234,123 B1 | 5/2001 | Iiyama et al. | |
| 6,318,083 B1 | 11/2001 | Machida et al. | |
| 6,325,039 B1 | 12/2001 | Goto | |
| 6,332,448 B1 * | 12/2001 | Ilyama et al. | 123/304 |
| 6,371,151 B1 * | 4/2002 | Saylor | 137/119.08 |
| 6,382,225 B1 | 5/2002 | Tipton | |
| 6,494,192 B1 | 12/2002 | Capshaw et al. | |
| 6,505,579 B1 | 1/2003 | Lee | |
| 6,553,974 B1 | 4/2003 | Wickman et al. | |
| 6,617,769 B2 | 9/2003 | Suzuki | |
| 6,619,242 B2 | 9/2003 | Kaneko | |
| 6,622,663 B2 * | 9/2003 | Weissman et al. | 123/1 A |
| 6,622,664 B2 * | 9/2003 | Holder et al. | 123/3 |
| 6,622,690 B2 | 9/2003 | Ando et al. | |
| 6,651,432 B1 | 11/2003 | Gray, Jr. | |
| 6,659,068 B2 | 12/2003 | Urushihara et al. | |
| 6,691,669 B2 | 2/2004 | Surnilla et al. | |
| 6,698,387 B1 | 3/2004 | McFarland et al. | |
| 6,711,893 B2 * | 3/2004 | Ueda et al. | 60/285 |
| 6,792,966 B2 | 9/2004 | Harvey | |
| 6,845,616 B2 | 1/2005 | Jauss | |
| 6,928,983 B2 | 8/2005 | Mashiki | |
| 6,951,202 B2 | 10/2005 | Oda | |
| 6,959,693 B2 | 11/2005 | Oda | |
| 6,972,093 B2 * | 12/2005 | Partridge et al. | 210/321.6 |
| 6,978,762 B2 | 12/2005 | Mori | |
| 6,988,485 B2 | 1/2006 | Ichise et al. | |
| 6,990,956 B2 | 1/2006 | Niimi | |
| 7,011,048 B2 * | 3/2006 | Gurin et al. | 123/1 A |
| 7,013,844 B2 * | 3/2006 | Oda | 123/3 |
| 7,055,500 B2 | 6/2006 | Miyashita et al. | |
| 7,082,926 B2 | 8/2006 | Sadakane et al. | |
| 7,107,942 B2 * | 9/2006 | Weissman et al. | 123/1 A |
| 7,159,568 B1 | 1/2007 | Lewis et al. | |
| 7,178,503 B1 | 2/2007 | Brehob | |
| 7,225,787 B2 * | 6/2007 | Bromberg et al. | 123/198 A |
| 7,255,080 B1 | 8/2007 | Leone | |
| 7,261,064 B2 | 8/2007 | Bhaisora et al. | |
| 7,278,396 B2 | 10/2007 | Leone et al. | |
| 7,287,492 B2 | 10/2007 | Leone et al. | |
| 7,287,509 B1 | 10/2007 | Brehob | |
| 7,293,552 B2 | 11/2007 | Leone et al. | |
| 7,302,933 B2 | 12/2007 | Kerns | |
| 7,389,751 B2 * | 6/2008 | Leone | 123/1 A |
| 7,933,713 B2 * | 4/2011 | Leone | 701/123 |
| 2001/0035215 A1 | 11/2001 | Tipton et al. | |
| 2003/0089337 A1 | 5/2003 | Cohn et al. | |
| 2003/0127072 A1 | 7/2003 | Gmelin et al. | |
| 2004/0035395 A1 | 2/2004 | Heywood et al. | |
| 2004/0065274 A1 | 4/2004 | Cohn et al. | |
| 2004/0083717 A1 | 5/2004 | Zhu et al. | |
| 2004/0250790 A1 | 12/2004 | Heywood et al. | |
| 2004/0261763 A1 | 12/2004 | Hashimoto et al. | |
| 2005/0051135 A1 | 3/2005 | Tomoda et al. | |
| 2005/0066939 A1 | 3/2005 | Shimada et al. | |
| 2005/0097888 A1 | 5/2005 | Miyashita | |
| 2005/0103285 A1 * | 5/2005 | Oda | 123/3 |
| 2005/0109316 A1 | 5/2005 | Oda | |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane | |
| 2005/0172931 A1 | 8/2005 | Mori | |
| 2005/0178356 A1 | 8/2005 | Shibagaki | |
| 2005/0178360 A1 | 8/2005 | Satou | |
| 2005/0183698 A1 | 8/2005 | Yonezawa | |
| 2005/0274353 A1 | 12/2005 | Okubo et al. | |
| 2006/0016429 A1 | 1/2006 | Mashiki | |
| 2006/0075991 A1 | 4/2006 | Heywood et al. | |
| 2006/0090732 A1 | 5/2006 | Shibagaki | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2006/0180099 A1 | 8/2006 | Aimoto et al. | |
| 2006/0191727 A1 | 8/2006 | Usami et al. | |
| 2007/0028861 A1 * | 2/2007 | Kamio et al. | 123/25 A |
| 2007/0028905 A1 | 2/2007 | Shinagawa et al. | |
| 2007/0034192 A1 | 2/2007 | Kamio et al. | |
| 2007/0119391 A1 | 5/2007 | Fried et al. | |
| 2007/0119392 A1 | 5/2007 | Leone et al. | |
| 2007/0119394 A1 | 5/2007 | Leone | |
| 2007/0119412 A1 | 5/2007 | Leone et al. | |
| 2007/0119413 A1 | 5/2007 | Lewis et al. | |
| 2007/0119414 A1 | 5/2007 | Leone et al. | |
| 2007/0119415 A1 | 5/2007 | Lewis et al. | |
| 2007/0119416 A1 | 5/2007 | Boyarski | |
| 2007/0119421 A1 | 5/2007 | Lewis et al. | |
| 2007/0119422 A1 | 5/2007 | Lewis et al. | |
| 2007/0119425 A1 | 5/2007 | Lewis et al. | |
| 2007/0204813 A1 | 9/2007 | Arai et al. | |
| 2007/0215069 A1 * | 9/2007 | Leone | 123/1 A |
| 2007/0215071 A1 | 9/2007 | Dearth et al. | |
| 2007/0215072 A1 | 9/2007 | Dearth et al. | |
| 2007/0215101 A1 | 9/2007 | Russell et al. | |
| 2007/0215102 A1 | 9/2007 | Russell et al. | |
| 2007/0215104 A1 | 9/2007 | Hahn | |
| 2007/0215110 A1 | 9/2007 | Stein et al. | |
| 2007/0215111 A1 | 9/2007 | Surnilla | |
| 2007/0215125 A1 | 9/2007 | Dearth et al. | |
| 2007/0215127 A1 | 9/2007 | Dearth et al. | |
| 2007/0215130 A1 | 9/2007 | Shelby et al. | |
| 2007/0219674 A1 * | 9/2007 | Leone | 701/1 |
| 2007/0219701 A1 | 9/2007 | Hashimoto et al. | |
| 2007/0221163 A1 | 9/2007 | Kamio | |
| 2007/0234976 A1 | 10/2007 | Dearth et al. | |
| 2007/0289573 A1 | 12/2007 | Leone et al. | |
| 2007/0295307 A1 | 12/2007 | Kerns | |
| 2008/0035106 A1 | 2/2008 | Stein | |
| 2008/0041334 A1 | 2/2008 | Brehob | |
| 2008/0072881 A1 | 3/2008 | Leone et al. | |
| 2008/0092851 A1 * | 4/2008 | Arakawa et al. | 123/445 |

| | | | |
|---|---|---|---|
| 2008/0127933 | A1 | 6/2008 | Blumberg et al. |
| 2009/0065409 | A1* | 3/2009 | Kamio et al. .................. 210/123 |
| 2010/0006050 | A1* | 1/2010 | Bromberg et al. ............ 123/1 A |

FOREIGN PATENT DOCUMENTS

| | | |
|---|---|---|
| JP | 61065066 | 4/1986 |
| JP | 62210229 A | 9/1987 |
| JP | 5163976 A | 6/1993 |
| JP | 2007/056754 | 3/2007 |
| WO | 2004/097198 | 11/2004 |
| WO | 2006/055540 | 5/2006 |
| WO | 2007/106354 | 9/2007 |
| WO | 2007/106416 | 9/2007 |

OTHER PUBLICATIONS

U.S. Appl. No. 60/780,981, filed Mar. 10, 2006, Cohn et al.
U.S. Appl. No. 60/781,598, filed Mar. 10, 2006, Blumberg et al.
U.S. Appl. No. 60/790,715, filed Apr. 10, 2006, Bromberg et al.
U.S. Appl. No. 60/746,507, filed May 5, 2006, Cohn et al.
U.S. Appl. No. 60/747,865, filed May 22, 2006, Heywood et al.
U.S. Appl. No. 60/832,836, filed Jun. 24, 2006, Bromberg et al.
U.S. Appl. No. 11/682,372, filed Mar. 6, 2007, Bromberg et al.
U.S. Appl. No. 11/683,564, filed Mar. 8, 2007, Bromberg et al.
U.S. Appl. No. 11/684,100, filed Mar. 9, 2007, Bromberg et al.
U.S. Appl. No. 60/948,753, filed Jun. 10, 2007, Bromberg et al.
U.S. Appl. No. 11/776,120, filed Jul. 11, 2007, Stein et al.
U.S. Appl. No. 11/782,050, filed Jul. 24, 2007, Bromberg et al.
U.S. Appl. No. 60/973,499, filed Sep. 19, 2007, Bromberg.
U.S. Appl. No. 11/871,496, filed Oct. 12, 2007, Zubeck et al.
U.S. Appl. No. 11/955,246, filed Dec. 12, 2007, Pursifull et al.
U.S. Appl. No. 11/962,683, filed Dec. 21, 2007, Pursifull et al.
U.S. Appl. No. 12/014,952, filed Jan. 16, 2008, Leone et al.
U.S. Appl. No. 12/048,395, filed Mar. 14, 2008, Boyarski.
U.S. Appl. No. 12/117,167, filed May 8, 2008, Leone et al.
U.S. Appl. No. 12/124,845, filed May 21, 2008, Lewis et al.
U.S. Appl. No. 12/176,832, filed Jul. 21, 2008, Lewis et al.
Bromberg, V. et al., "Calculations of Knock Suppressions in Highly Turbocharged Gasoline/Ethanol Engines Using Direct Ethanol Injection", Jul. 7, 2005, Massachusetts Institute of Technology.
Brusca, S. et al., "Water Injection in IC—SI Engines to Control Detonation and to Reduce Pollutant Emissions", SAE Technical Paper No. 2003-01-1912, May 19-22, 2003.
Cohn, D.R. et al., "Direct Injection Ethanol Boosted Gasoline Engines: Biofuel Leveraging for Cost Effective Reduction of Oil Dependence and CO2 Emissions", Mar. 15, 2005, Massachusetts Institute of Technology.
Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.
Russ, Stephen "A Review of the Effect of Engine Operating Conditions on Borderline Knock", SAE Technical Paper Series 960497, Feb. 26-29, 1996.
Vance, Bill, "Turbocharger Boosted Engine's Efficiency: Developed to maintain high-altitudeperformance," for the Calgary Herald Edmonton, www.ucalgary.ca/~csimpson/Articles/JetFire.html, Nov. 7, 2006.
Office Action of Chinese Application No. 200610148453.4, Issued Mar. 24, 2011, State Intellectual Property Office of PRC, 9 Pages.

* cited by examiner

US 8,267,074 B2

CONTROL FOR KNOCK SUPPRESSION FLUID SEPARATOR IN A MOTOR VEHICLE

CROSS-REFERENCE TO RELATED APPLICATIONS

The present application is a continuation-in-part of Application Ser. No. 11/384,111, titled CONTROL FOR KNOCK SUPPRESSION FLUID SEPARATOR IN A MOTOR VEHICLE, filed Mar. 17, 2006, now Pat. No. 7,389,751, issued Jun. 24, 2008, the entire contents of which are incorporated herein by reference in their entirety for all purposes.

BACKGROUND AND SUMMARY

Engines may use various forms of fuel delivery to provide a desired amount of fuel for combustion in each cylinder. One type of fuel delivery uses a port injector for each cylinder to deliver fuel to respective cylinders. Still another type of fuel delivery uses a direct injector for each cylinder.

Further, engines have been proposed using more than one type of fuel injection. For example, the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. are one example. Specifically, the Heywood et al. papers describe directly injecting ethanol to improve charge cooling effects, while relying on port injected gasoline for providing the majority of combusted fuel over a drive cycle. The ethanol provides increased octane and increased charge cooling due to its higher heat of vaporization compared with gasoline, thereby reducing knock limits on boosting and/or compression ratio. Further, water may be mixed with ethanol and/or used as an alternative to ethanol. The above approaches purport to improve engine fuel economy and increase utilization of renewable fuels.

One issue with the above approach is that requiring a user to always provide separate fuels (e.g., gasoline and ethanol) can be burdensome and impede wide-spread acceptance of such fuel economy improving technology. Therefore, in one approach, on-board vehicle separation may be used to take advantage of already available alcohol mixtures, such as E10 (10% ethanol and 90% gasoline) or E85 (85% ethanol and 15% gasoline), while taking advantage of delivering components of the mixture to the engine in varying ratios (and/or through different injectors), for example. However, since the user may provide varying concentrations (e.g., sometimes E85, sometimes E10, and/or sometimes gasoline), the separator and fuel diverting valves may be adjusted based on operating conditions, such as based on the constituents in the fuel tank or engine usage rates. Further, it may be adjusted based on operating conditions of the engine (e.g. engine load or engine knock) and ambient conditions. In this way, it is possible to improve overall performance by adjusting separator operation or the fuel flow paths responsive to the particular operating conditions of the engine, environment, and supplied fuel mixture by the user.

DETAILED DESCRIPTION

Figure 1:
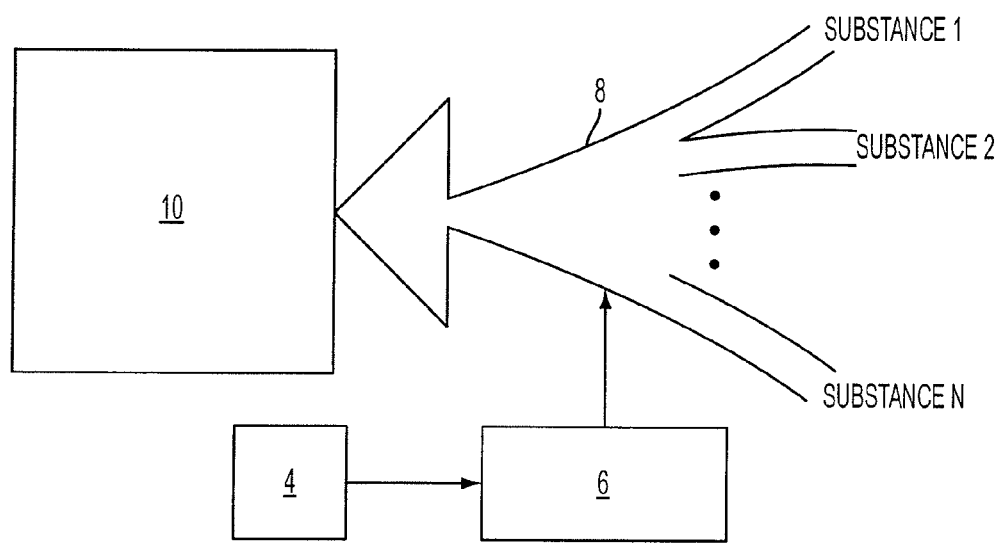
FIG. 1 shows a generic engine system.

FIG. 1 shows an engine 10 receiving delivery of a plurality of substances (1, 2, . . . , N) via arrow 8. The various substances may include multiple different fuel blends, injection locations, or various other alternatives. In one example, multiple different substances having different gasoline and/or alcohol and/or water concentrations may be delivered to the engine, and may be delivered in a mixed state, or separately delivered. Further, the relative amounts and/or ratios of the different substances may be variable controlled by a controller 6 in response to operating conditions, which may be provided via sensor(s) 4.

In one example, the different substances may represent different fuels having different levels of alcohol, including one substance being gasoline and the other being ethanol. In another example, engine 10 may use gasoline as a first substance and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), a mixture of an alcohol and water, a mixture of an alcohol, water, and gasoline, etc as a second substance. In still another example, the first substance may be a gasoline alcohol blend with a lower alcohol concentration than a gasoline alcohol blend of a second substance.

In another embodiment, different injector locations may be used for different substances. For example, a single injector (such as a direct injector) may be used to inject a mixture of two substances (e.g., gasoline and an alcohol/water mixture), where the relative amount or ratio of the two substances in the mixture may be varied during engine operation via adjustments made by controller 6 via a mixing valve (not shown), for example. In still another example, two different injectors for each cylinder are used, such as port and direct injectors, each injecting a different substance in different relative amounts as operating conditions vary. In even another embodiment, different sized injectors, in addition to different locations and different substances, may be used. In yet another embodiment, two port injectors with different spray patterns and/or aim points may be used.

As will be described in more detail below, various advantageous results may be obtained by the above systems. For example, when using both gasoline and a fuel having alcohol (e.g., ethanol), it may be possible to adjust the relative amounts of the fuels to take advantage of the increased charge cooling of alcohol fuels (e.g., via direct injection) to reduce the tendency of knock (e.g., in response to knock or increased load, increasing a relative amount of alcohol and/water). This phenomenon, combined with increased compression ratio, and/or boosting and/or engine downsizing, can then be used to obtain large fuel economy benefits (by reducing the knock limitations on the engine), while allowing engine operation on gasoline at lighter loads when knock is not a constraint. However, when combusting a mixture having alcohol, the likelihood of pre-ignition may be increased under certain operating conditions. As such, in one example, by utilizing water instead of or mixed into the substance having alcohol, it may be possible to reduce the likelihood of pre-ignition, while still taking advantage of increased charge cooling effects and the availability of alcohol containing fuels.

Figure 2:
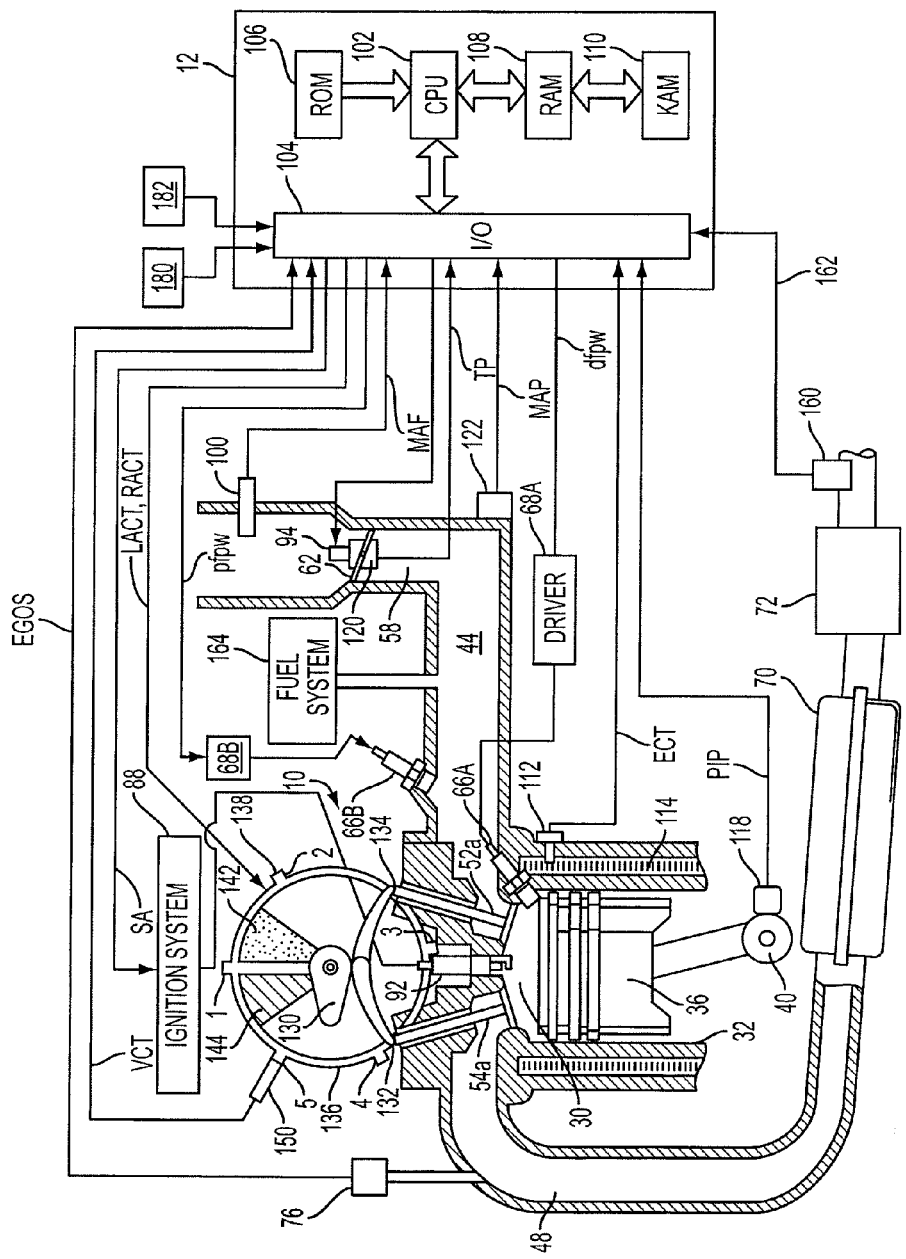
FIG. 2 shows a partial engine view.

Referring now to FIG. 2, it shows one cylinder of a multi-cylinder engine, as well as the intake and exhaust path connected to that cylinder. Further, FIG. 2 shows one example fuel system with two fuel injectors per cylinder, for at least one cylinder. In one embodiment, each cylinder of the engine may have two fuel injectors. The two injectors may be configured in various locations, such as two port injectors, one port injector and one direct injector (as shown in FIG. 2), or others.

Also, as described herein, there are various configurations of the cylinders, fuel injectors, and exhaust system, as well as various configurations for the fuel vapor purging system and exhaust gas oxygen sensor locations.

Continuing with FIG. 2, it shows a multiple injection system, where engine 10 has both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal dfpw received from controller 12 via electronic driver 68A. While FIG. 2 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel and/or water may be delivered to fuel injector 66A by a high pressure fuel system (not shown) including a fuel tank, fuel pumps, and a fuel rail. Alternatively, fuel and/or water may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake manifold 44, rather than directly to cylinder 30. Fuel injector 66B delivers injected fuel in proportion to the pulse width of signal pfpw received from controller 12 via electronic driver 68B. Note that a single driver 68 may be used for both fuel injection systems, or multiple drivers may be used. Fuel system 164 is also shown in schematic form delivering vapors to intake manifold 44, where fuel system 164 is also coupled to injectors 66A and 66B (although not shown in this Figure). Various fuel systems and fuel vapor purge systems may be used.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and/or a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

While FIG. 2 shows two injectors for the cylinder, one being a direct injector and the other being a port injector, in an alternative embodiment two port injectors for the cylinder may be used, along with open valve injection, for example.

Emission control device 72 is shown positioned downstream of catalytic converter 70. Emission control device 72 may be a three-way catalyst or a NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide different cam profiles under different operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 2 merely shows one cylinder of a multi-cylinder engine, and it is understood that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column, for example. The starter is disengaged after engine starting, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling valve timing.

As noted above, engine 10 may operate in various modes, including lean operation, rich operation, and "near stoichiometric" operation. "Near stoichiometric" operation can refer to oscillatory operation around the stoichiometric air fuel ratio. Typically, this oscillatory operation is governed by feedback from exhaust gas oxygen sensors. In this near stoichiometric operating mode, the engine may be operated within approximately one air-fuel ratio of the stoichiometric air-fuel ratio.

Feedback air-fuel ratio control may be used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. Adjustments may be made with injector 66A, 66B, or combinations thereof depending on various factors, to control engine air-fuel ratio.

Figure 3:
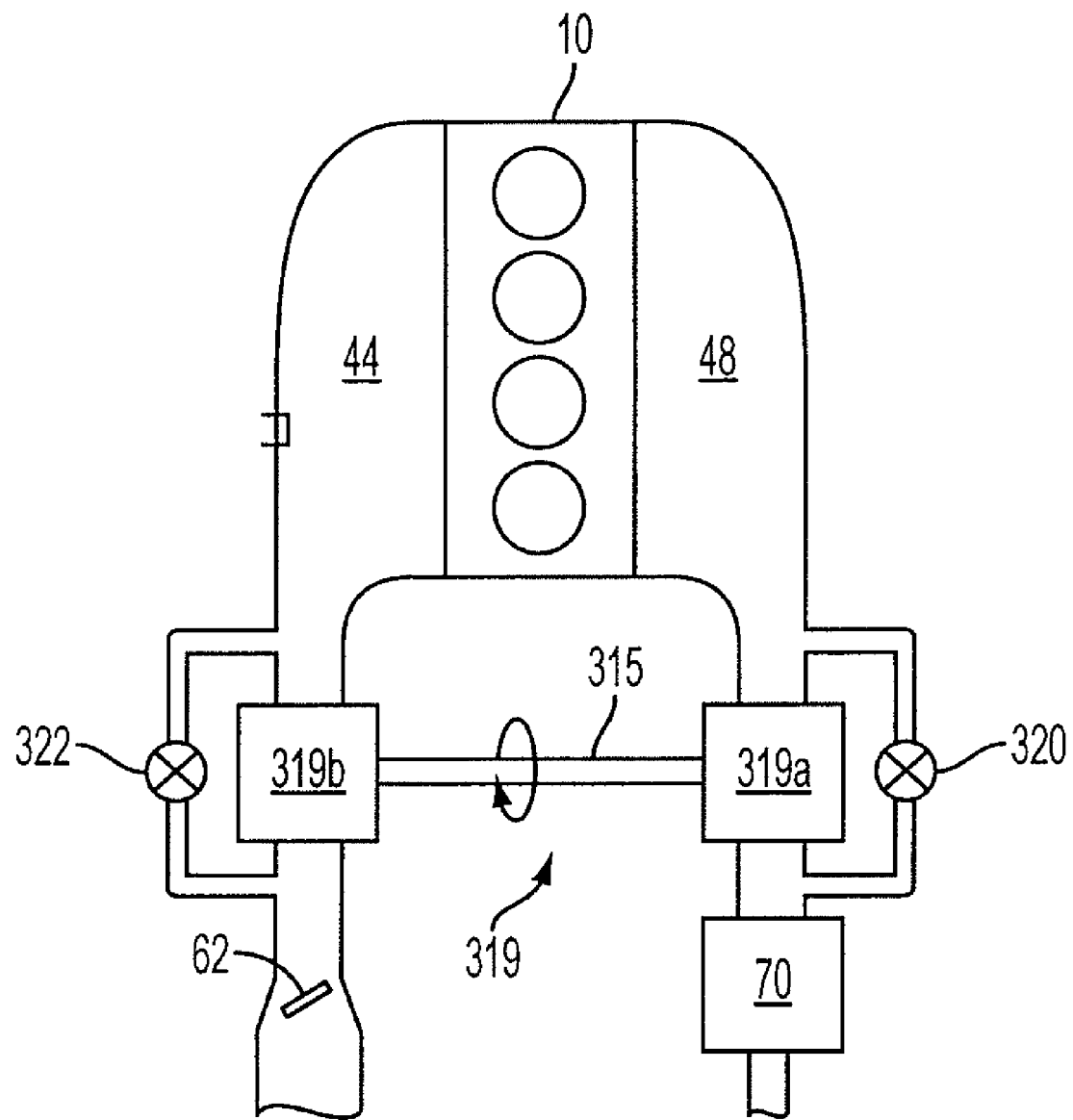
FIG. 3 shows an engine with a turbocharger.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders. While not shown in FIG. 2, engine 10 may be coupled to various boosting devices, such as a supercharger or turbocharger, as shown in FIG. 3. On a boosted engine, desired torque may also be maintained by adjusting wastegate and/or compressor bypass valves.

Referring now specifically to FIG. 3, an example engine 10 is shown with four in-line cylinders. In one embodiment, engine 10 may have a turbocharger 319, which has a turbine 319a coupled to the exhaust manifold 48 and a compressor 319b coupled to the intake manifold 44. While FIG. 3 does not show an intercooler, one may optionally be used. Turbine 319a is typically coupled to compressor 319b via a drive shaft 315. Various types of turbochargers and arrangements may be used. For example, a variable geometry turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 3 shows an example bypass valve 320 around turbine 319a and an example bypass valve 322 around compressor 319b, where each valve may be controlled via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a mechanically or electrically driven supercharger may be used, if desired.

Figure 4:
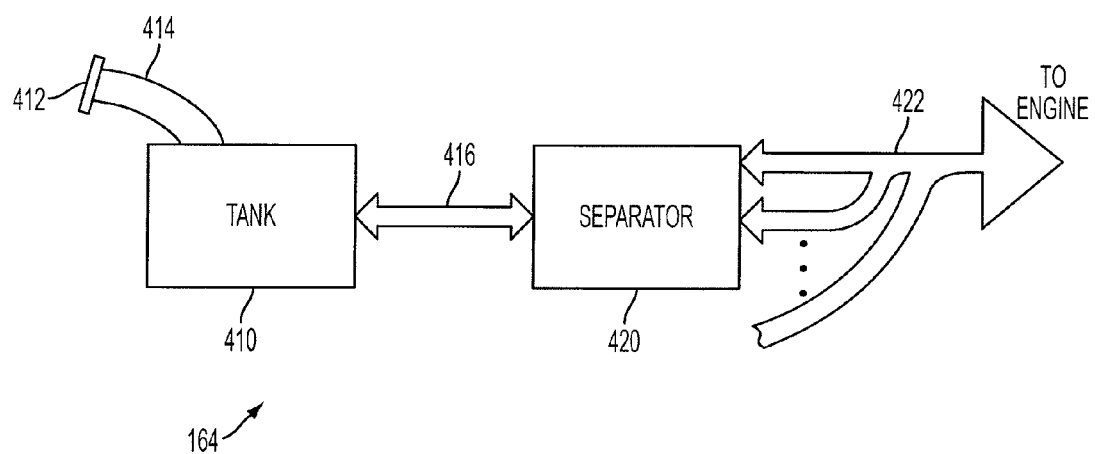
FIG. 4 shows an example fuel system layout.

Referring now to FIG. 4, an example fuel system layout is provided with fuel tank 410 having fuel fill cap 412. The system is configured to receive a fuel mixture through the fill line 414 and into tank 410, where the mixture may be a gasoline/alcohol mixture, a gasoline/alcohol/water mixture, or various others such as noted herein, including, a gasoline/ethanol mixture such as E10, for example. The fuel mixture in tank 410 may be transported to a separate system 420 via a transport system, shown by double arrow 416. The transport system 416 may be a one way transport, e.g., transporting the fuel mixture to the separator, or may enable two-way transportation, such as return lines from the separator or downstream fuel system back to the tank 410. The transport system 416 may include pumps, valves, multiple separate lines, or various other components, such as described below herein with regard to example systems. Further, while FIG. 4 shows the transport system 416 external to tank 410, system 416 along with separate 420 and/or portions of transport system 422 may also be located within or at least partially within tank 410.

Separator 420 may include various types of separator system. The separator system is generally configured to allow two or more components in the fuel mixture stored in tank 410 to be separated and provided separately to engine 10, thereby permitting the advantages of multiple or mixed injection strategies to be employed without causing inconvenience to a user. In one example, the separator system utilizes an aqueous extraction to remove fuel components soluble in water (such as methanol, ethanol, etc.) from fuel components not soluble in water. For example, an extraction fluid (e.g., water) may be added to a gasoline/alcohol mixture, and the mixture drawn off at different levels, where the lower level provides an alcohol enriched substance. In another example, a barrier in a tank may be used, where the barrier is made at least partially of a material or materials that selectively transports one component of the mixed fuel at a higher rate than, or even to the substantial exclusion of, the other component of the mixed fuel. In still another example, the barrier may be an ionically or electrically conductive polymeric or inorganic material, polypyrole being one example of a conductive polymer. A voltage and/or current may be applied across and/or through the membrane using a voltage and/or current supply, respectively. In this way, substances may be extracted at different rates and/or concentrations, for example.

Figure 5:
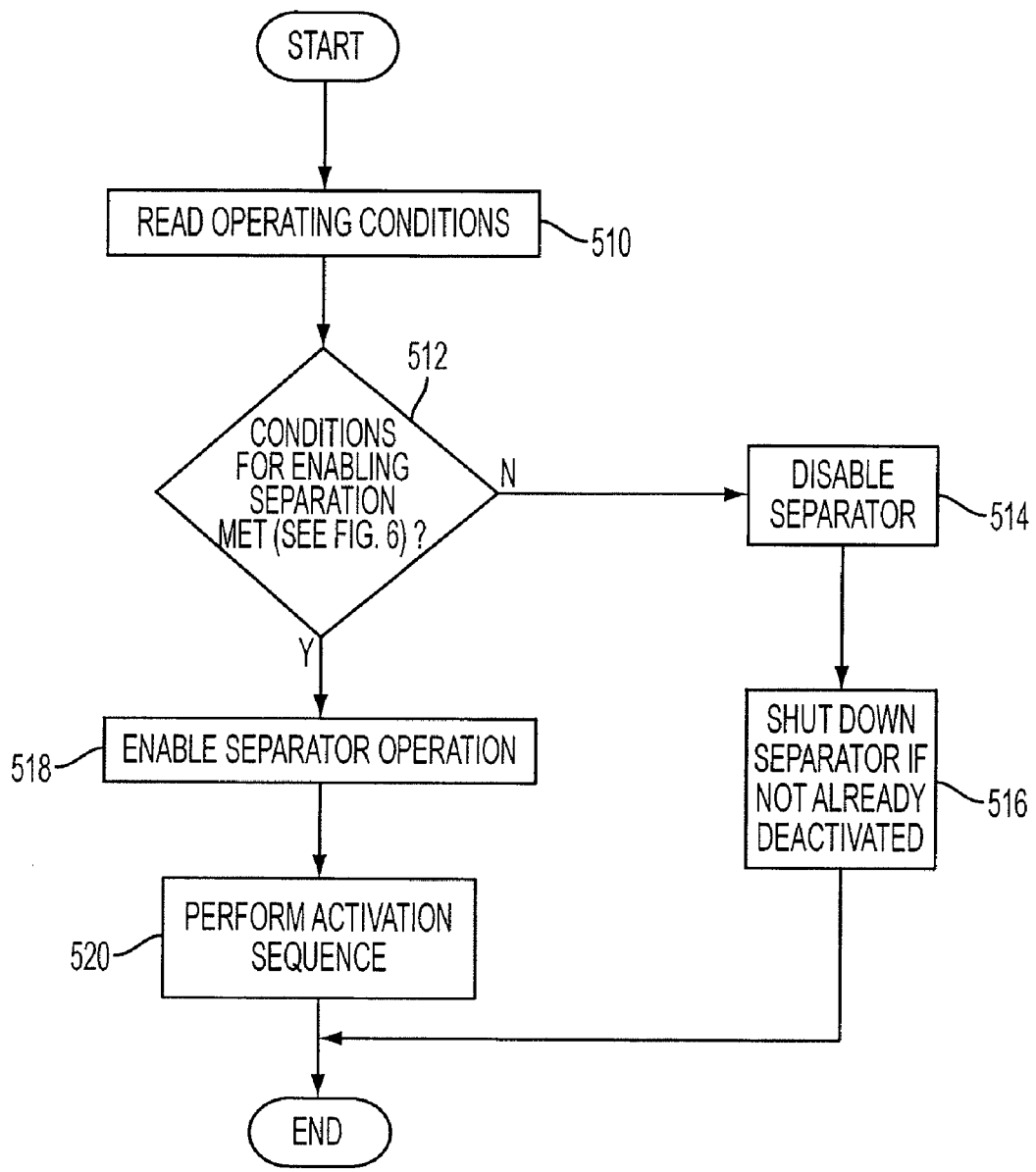
FIGS. 5-6 show example enablement routines.

Continuing with FIG. 4, it also shows downstream transport system 422 located between separator 420 and the engine (not shown). Transport system 422 is shown having at least two separate lines coupled to the separator to transport different amounts of substances with different constituents to the engine depending on operating conditions. Transport system 422 may maintain the different substances separate in delivering the substances to the engine, or may mix the substances for co-delivery to the engine, as illustrated in FIG. 4. Further, like system 416, system 422 may include pumps, valves, multiple separate lines, return lines, or various other components, such as described below herein with regard to example systems Referring now to FIGS. 5-6, example routines for controlling system operations are provided, in particular for enabling and controlling separator operation. In 510, the routine reads operating conditions, such as those noted below in FIG. 6. Then, in 512, the routine determines whether conditions for enabling separator operation are met. Various conditions may be used to enable/disable separate operation, such as those noted with regard to FIG. 6. If the answer to 512 is no, the routine continues to 514 to disable separator operation and then to shutdown the separator in 516 if it is not already deactivated. The shutdown may be a gradual shutdown, or may be adjusted depending on the operating conditions. For example, under some conditions, a more rapid shutdown may be used than other conditions.

If the answer to 512 is yes, the routine continues to 518 to enable separator operation. Then in 520, the routine performs an activation sequence to activate the separator if it is not already active. The activation sequence may include warm-up operation to initiate separation, and may be adjusted depending on engine, vehicle, and/or ambient operating conditions. For example, the separator may have a more rapid activation sequence under warmer ambient conditions.

Figure 6:
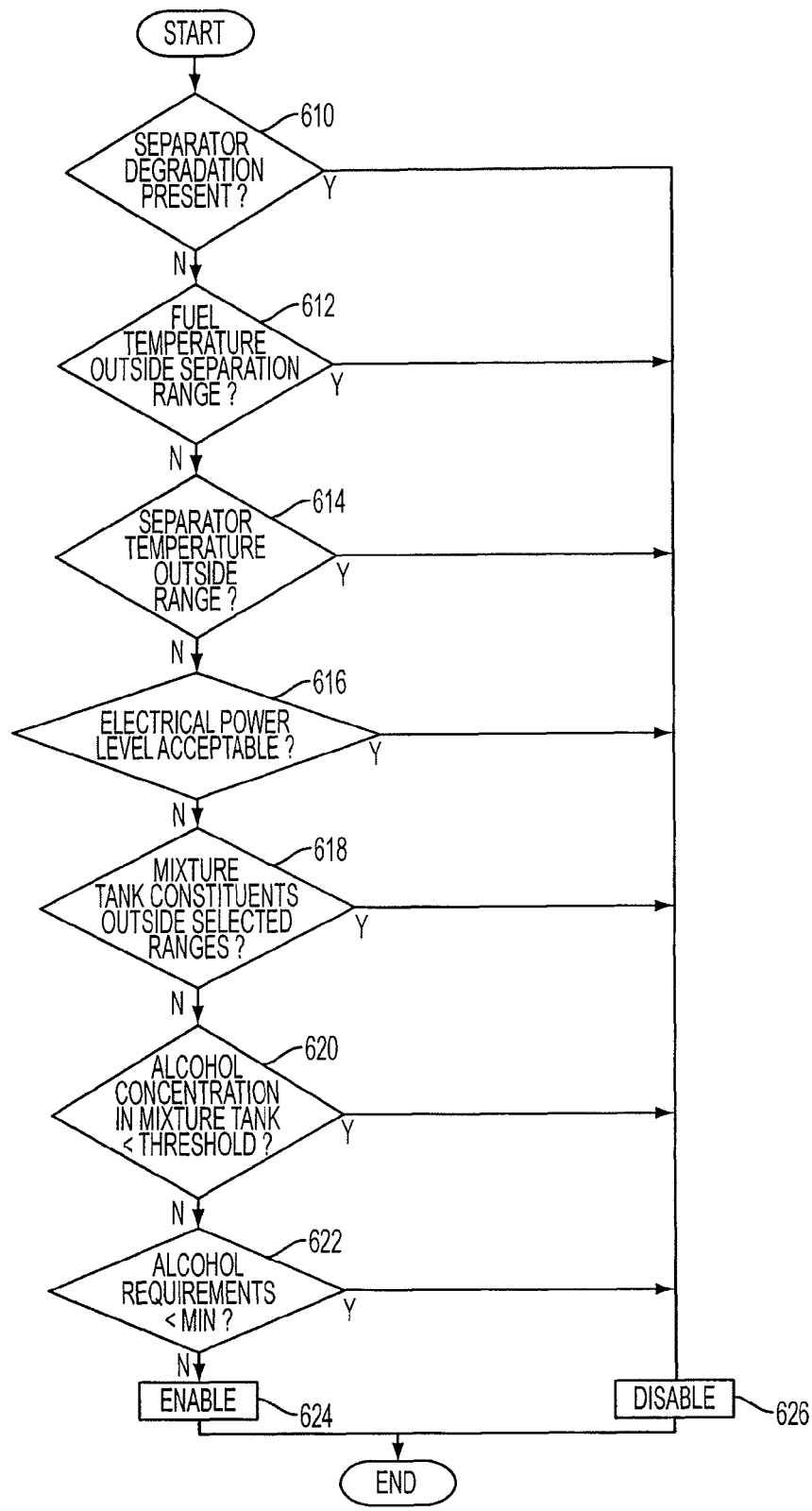

Referring now to FIG. 6, details of the separator enablement are described. While the following conditions may be used to enable/disable separator operation, various other, or alternative combinations of these parameters may be used. In 610, the routine first determines whether separator degradation has occurred or been detected. Degradation may be detected in a variety of ways, such as based on measured separator operation compared to expected operation for a given set of conditions. For example, the routine may monitor separator performance, fuel separation rate, fuel separation percentage yield, or various others. If the answer to 610 is no, the routine continues to 612 to determine whether fuel temperature is outside a range for separator operation. The range may vary with operating conditions such as an estimate of fuel types in the tank or separator, relative fuel quantities, in the tank or separator, or various others.

If the answer to 612 is no, the routine continues to 614 to determine whether the separator and/or any of its components are outside a temperature range for separator operation. Again, the range may vary with operating conditions such as an estimate of fuel types in the tank or separator, relative fuel quantities in the tank or separator, engine operating conditions, or various others.

If the answer to 614 is no, the routine continues to 616 to determine how in the case of an electrically actuated separator, electrical power related values compare to acceptable values or thresholds. For example, the routine may determine whether the amount of energy used by the separator in separating the current fuel under the current conditions is less than a threshold value. Alternatively, the routine may consider vehicle battery voltage, state of charge, and/or electrical power generation conditions. For example, if battery voltage or state of charge is above a threshold valve, separator operation may be enabled.

If the answer to 616 is no, the routine continues to 618 to determine whether tank fuel mixture constituents are outside selected ranges in which separator operation is performed. For example, if a certain constituent to be separated is below a certain relative amount in the incoming fuel, separation may be disabled due to low yields. Alternatively, if another constituent is above a threshold valve, separation may be disabled due to interference in separation performance.

If the answer to 618 is no, the routine continues to 620 to determine whether, in the case of alcohol separation, an alcohol concentration in the fuel tank mixture is less than a threshold value. For example, if the amount of alcohol in the mixture is below a threshold, separation may be disabled due to low alcohol availability.

If the answer to 620 is no, the routine continues to 622 to determine whether, in the case of alcohol separation, alcohol requirements are less than a threshold value. For example, if the engine and/or vehicle are operating under conditions in which a separated alcohol mixture is not needed, or only minimally needed, separation may be disabled. In one example, if the engine coolant temperature is less than a minimum temperature (e.g., during a cold start), the separated mixture may not be used, and thus the separator may be disabled. Likewise, if the separated mixture is delivered via a separate injection system that has degraded, separator operation may be disabled.

From a yes answer to any of 610 through 622, the routine continues to 626 to disable separation. Alternatively, if the answer to 622 is no, the routine continues to 624 to enable separator operation. In this way, it is possible to provide appropriate operation of the separator in the context of vehicle operation and degradation over vehicle life.

Figure 7:
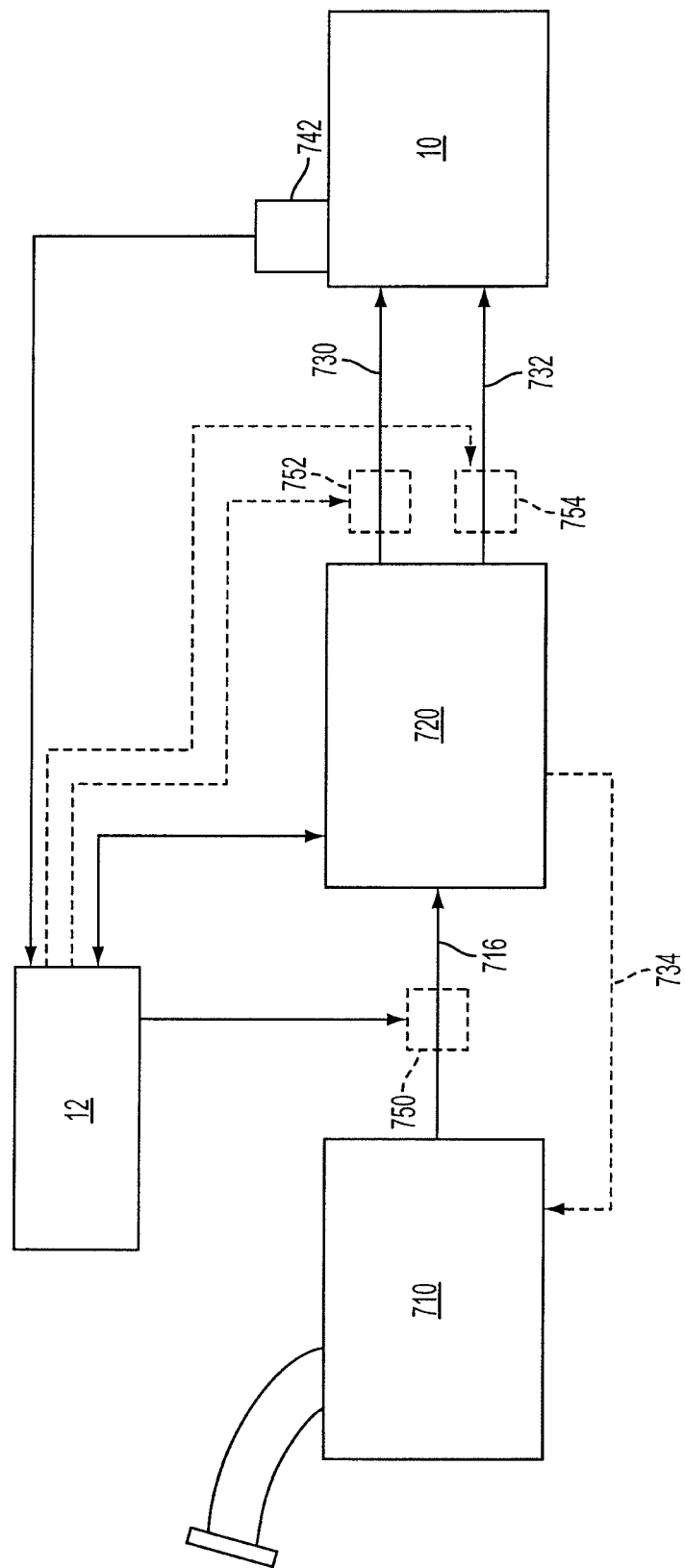
FIGS. 7, 9, and 11 show alternative fuel system layouts.
Figure 9:
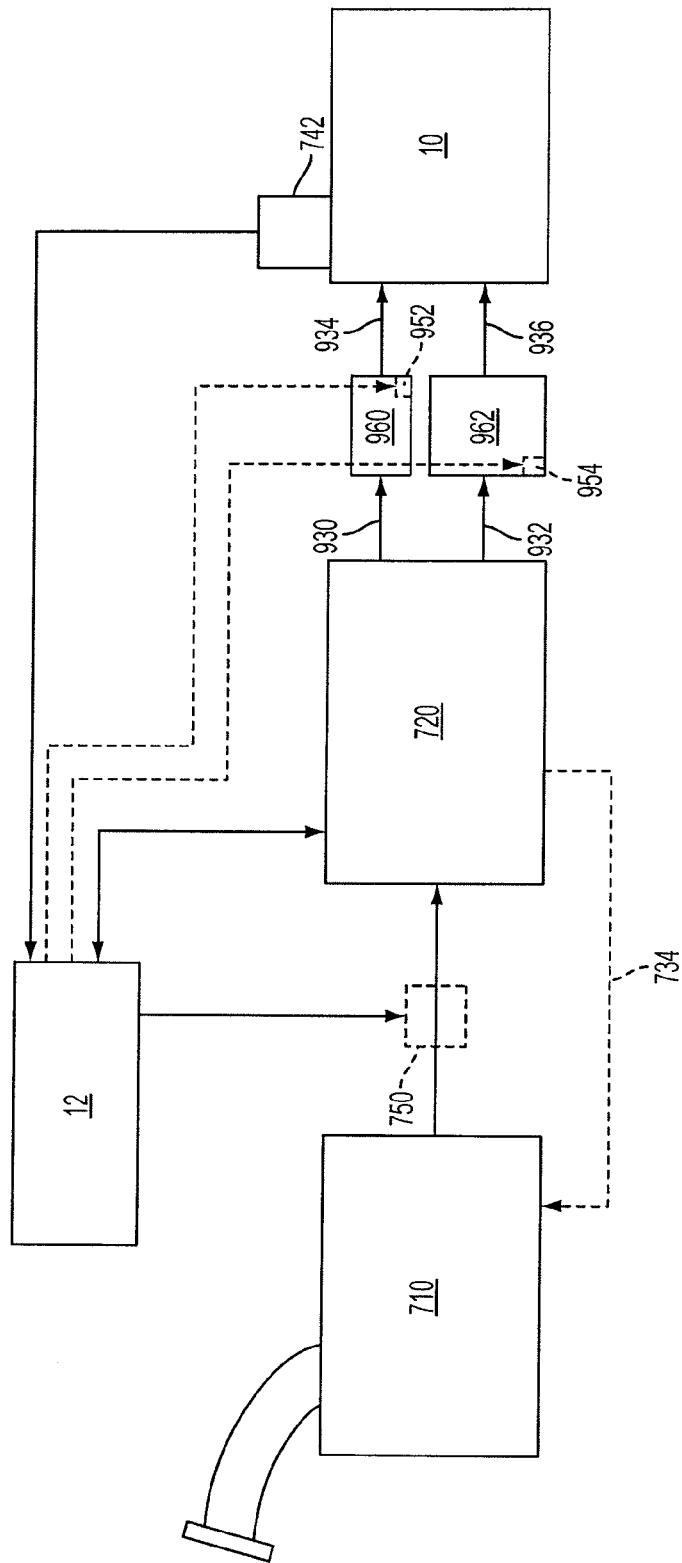
Figure 11:
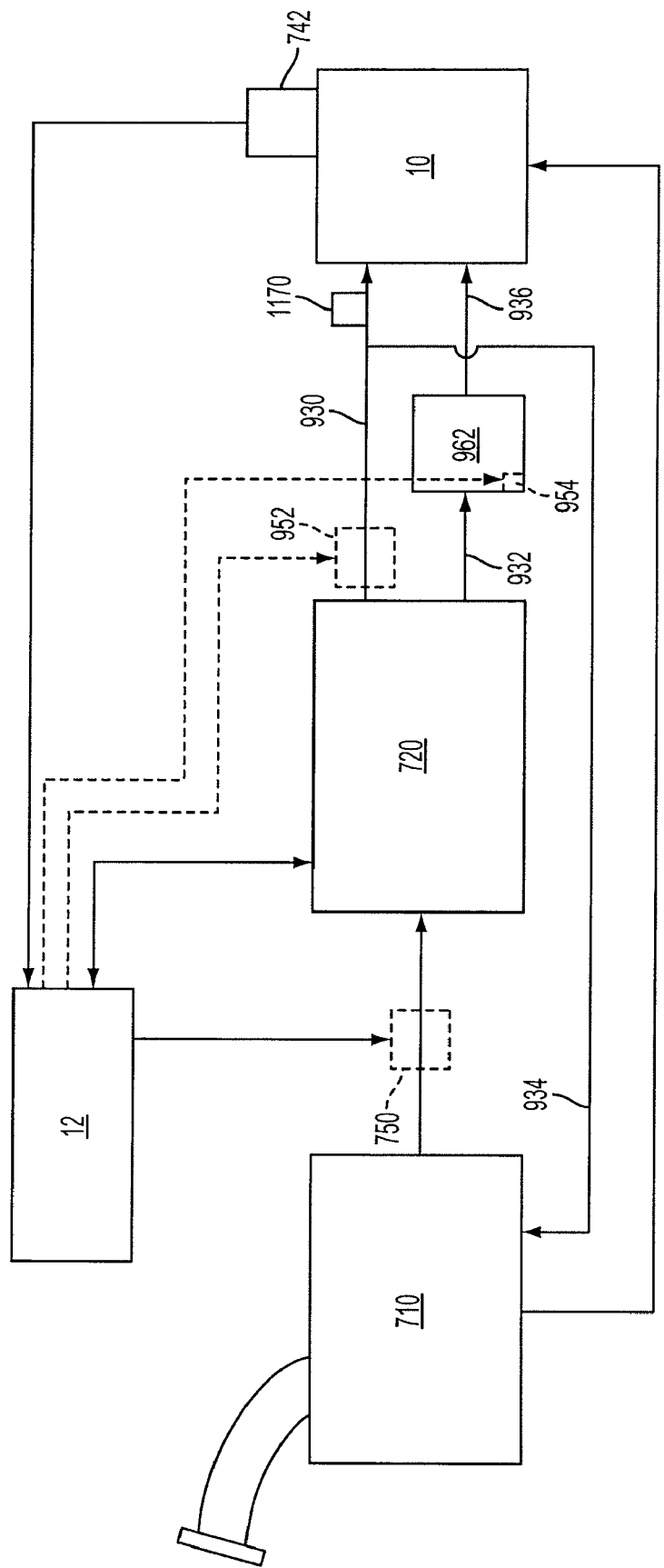

Referring now to FIGS. 7, 9, and 11, example fuel systems are illustrated, along with associated control routines for separator and/or engine control.

Specifically, FIG. 7 illustrates an example fuel system layout in which a separator 720 is used to separate at least ethanol from a fuel mixture in tank 710 having at least gasoline and ethanol. In one example, the separator may receive as an input a gasoline/ethanol mixture 716 with a first ethanol concentration and generate two output gasoline/ethanol mixtures (730, 732), one with a second ethanol concentration and one with a third ethanol concentration. In one example, the third ethanol concentration is higher than the first ethanol concentration, which is higher than the second ethanol concentration. The two outputs mixtures are fed to engine 10, for example, output 730 may be fed to a port fuel injector (e.g., 66A) and output 732 may be fed to a direct injector (e.g., 66B).

In one example, a pump 750 may be provided to pressurize the mixture 716, shown in dashed lines. In addition, or alternatively, pumps 752 and 754 may be provided in 730 and 732, respectively. The pump(s) may be controlled via controller 12, which also receives various inputs, such as information from sensor(s) 742. Further, controller 12 may control separator 720, in addition to engine and/or vehicle operation.

For the example system of FIG. 7, it may advantageously be used in the case that the separate can generate sufficient quantities of a higher alcohol concentration fuel mixture to handle a substantial portion of engine and/or vehicle operation, and as such an additional storage tank for one or both of mixtures 730 and 732 is not required (although it may be added, if desired).

In this case, one optional control strategy for the separator may include operating the separator at various production/generation rates and/or concentrations depending on engine fueling requirements and operating conditions. In one embodiment, the controller may operate the separator in a manner sufficient to produce a required alcohol amount for the current engine operating conditions or current engine fueling demand. The current engine demand could be determined from the engine controller, or calculated from injector pulsewidth and fuel pressure. Alternatively, feedback control of fuel pressure or another parameter could be used to supply enough production to meet demand and maintain pressure.

For example, in the case where the mixture in 732 has a higher alcohol concentration than that of 730, the separator may be controlled in response to which mixture is limiting. In other words, in the case where mixture 732 is being used faster than generation/separation, the separator may be adjusted to increase the amount of mixture 732. Likewise, in the case where mixture 730 is being used faster than generation/separation, the separator may be adjusted to increase the amount of mixture 730. In these cases, return lines (not shown) may be used to return excess amounts of mixtures 730 and/or 732 to tank 710.

If the separator transient response is slower than required for the engine, feed forward controls can be used, where a predicted demand is calculated based on current and/or past operating conditions, as well as adaptive learning, for example. In another example, this may involve predictions of future engine demand based on recent demand, earlier patterns of demand, fuzzy logic, etc. Alternatively, the separator could always operate at a higher rate than currently necessary (with unused ethanol returned to the tank via optional return line 734). The amount of excess separation could also be varied based on operating conditions such as recent demand, earlier patterns of demand, fuzzy logic, etc. In still another alternative, the amount of excess separation/generation could be a function of current demand for mixture 732, engine speed/load/temperature, and/or combinations thereof.

The level of detail in control adjustments and/or accuracy desired may depend on parasitic losses of the ethanol separator. For example, in the case of an electrically actuated/powered separator, if the separator electric power or other input requirements are relatively low (e.g. less than a threshold value), the separator may operate whenever the engine is running, or with simple on/off control whenever some ethanol is demanded. However, if parasitic losses are greater, two or three level modulation of the separator may be used. Further, if parasitic losses are still greater, then the more detailed enablement of FIG. 6 may be used, along with the varying operation of FIG. 8 may be used to reduce the losses by operating with reduced excess separation and with the level of separation matched to current and/or future predicted operating conditions.

Figure 8:
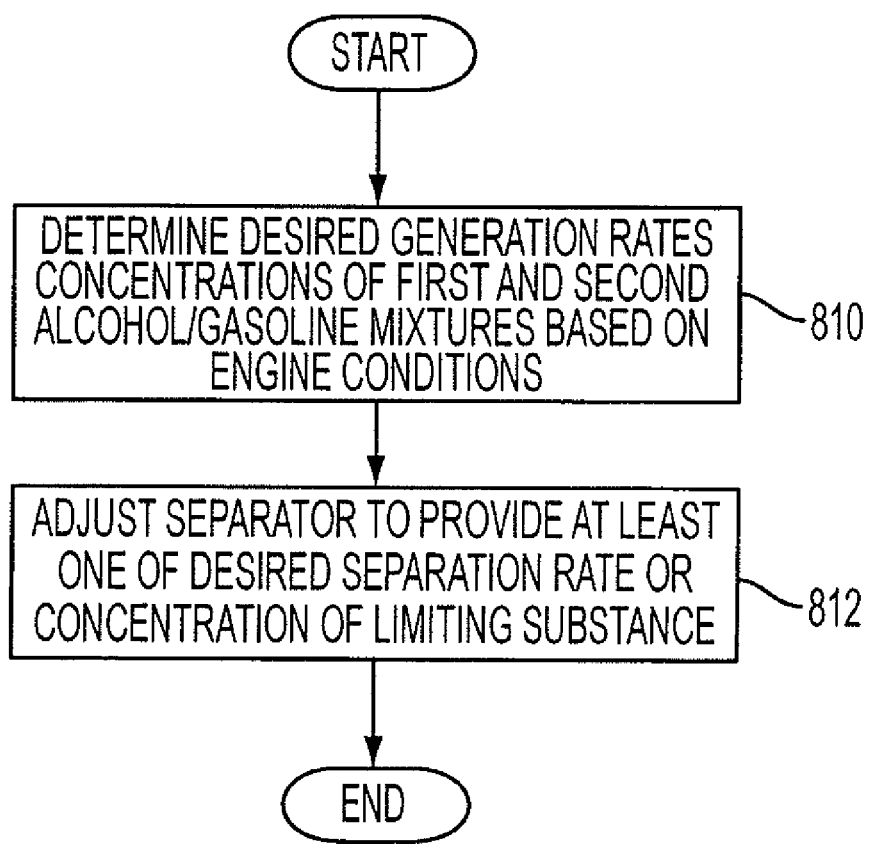
FIGS. 8, 10, and 12 show separator control routines for various fuel system layouts.

Specifically, with regard to FIG. 8, a routine is described for controlling separator operation, such as for the configuration of FIG. 7. In 810, the routine determines a desired generation rate of a first and second mixture from the separator based on operating conditions, such as engine demand, fueling demand, driver input, and/or combinations thereof as noted above herein. Further, in addition to a desired generation rate, the routine may also determine a desired concentration of the output mixtures. In addition, the routine may determine which desired rate is limiting the generation rates of multiple output mixtures which are interdependent. Then, in 812, the routine adjusts the separator to provide at least one of the desired generation rates (or concentrations) of the limiting mixture.

Referring now to FIG. 9, another example fuel system is provided similar to that of FIG. 7, except that each of two output mixtures 930 and 932 having respective storage tanks 960 and 962 to enable buffering of the generation rate from the engine usage rate. In this way, it is possible to provide more consistent generation rate and thereby improve generation efficiency under selected conditions. Specifically, in FIG. 9, two storage tanks 960 and 962 (each having an optional pump 952 and 954 therein, respectively) receive outputs from separator 720 via lines 930 and 932, respectively, and provide mixtures 934 and 936 to engine 10. As noted above, the mixture of 934 may be fed to a port injector of a cylinder, and the mixture of 936 may be fed to a direct injector in a cylinder in engine 10.

Due to the ability to store both of the generated mixtures, with this fuel system it may be possible to control separator 720 to provide improved generation efficiency, while also providing sufficient generation to maintain sufficient fuel mixtures in both tanks 960 and 962.

Figure 10:
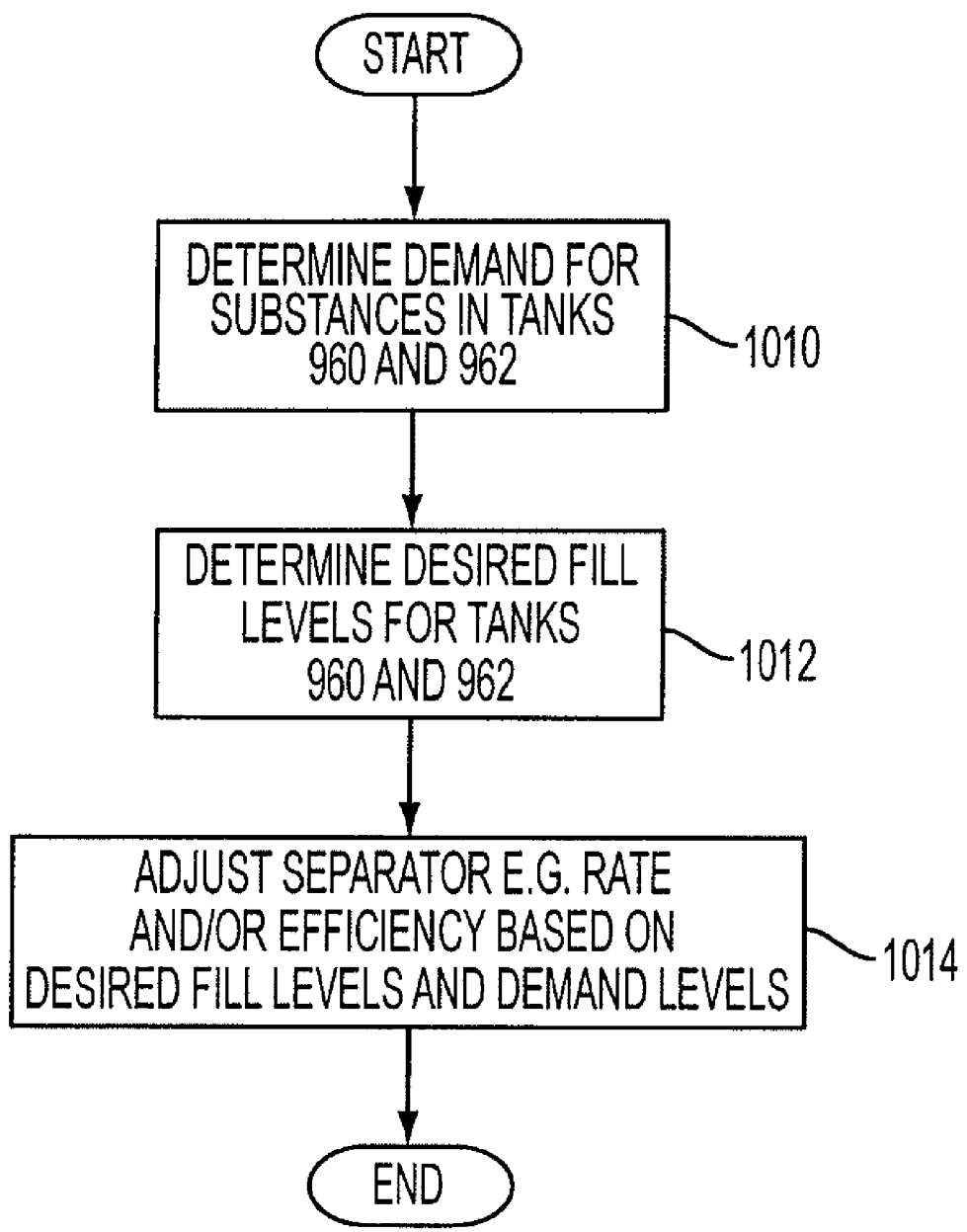

Referring now to FIG. 10, a routine is described for controlling at least separator operation. Specifically, in 1010, the routine determines demand levels for the substances of tanks 960 and 962, respectively. As noted herein, the demand may be based on current or predicted engine fueling requirements, torque requests, or various others.

Next, in 1012, the routine determines the desired fill levels of tanks 960 and 962, respectively, which may be based on current engine, vehicle, and/or ambient operating conditions. Then, in 1014, the routine adjusts separator operation (e.g., separator rate, efficiency, or other) based on the desired fill levels and demand levels. For example, it may be desirable to provide sufficient fuel in tank 960 (which may be gasoline with a lower alcohol concentration than provided or in tank 962), which may be preferable to improve fuel vaporization and transient A/F control under selected conditions, and therefore reduce exhaust emissions for a cold start. For example, in this case, the separator controls may continue operating the separator when tank 962 is sufficiently filled, so that sufficient fuel is stored in tank 960 for the next cold start.

As another example, the separator may shift production between the higher and lower alcohol concentration outputs so as to not overfill either of tanks 960 or 962. Or the separator may be operated to ensure sufficient alcohol-rich mixture in tank 962 for one or more wide-open throttle accelerations to highway speed.

Referring now to FIG. 11, another example fuel system is provided similar to that of FIGS. 7 and 9, except that only one of two output mixtures (932) has a storage tank 962 to enable buffering of the generation rate from the engine usage rate. In this way, it is possible to provide more consistent generation rate of the mixture in 932 and thereby improve generation efficiency under selected conditions, while reducing system storage costs, since the excess generation from the other output mixture 930 is returned to tank 710 via line 934, e.g., using pressure regulator 1170.

In one example, such a system can reduce the system size and cost and packaging space by avoiding the separate tanks used in FIG. 9.

Figure 12:
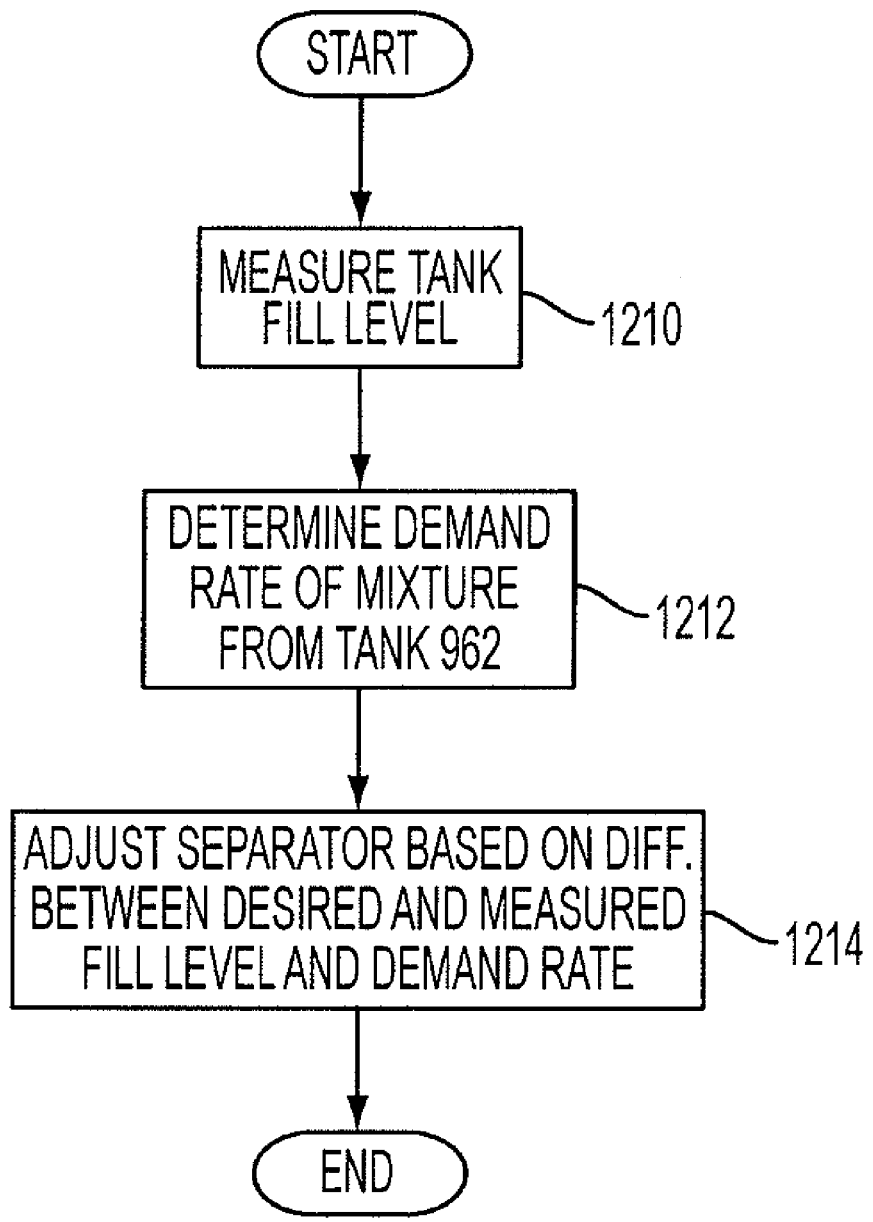

One example control routine for the configuration of FIG. 11 is illustrated in FIG. 12. In one embodiment, the control routines may maintain sufficient mixture level in tank 962 with the higher alcohol concentration (e.g., ethanol) to power the engine for one or more wide-open throttle accelerations to highway speed. Again, different control actions may be taken to account for variation of the size and the parasitic losses of the separator. For example, if the separator requires low electric power or other inputs, it may operate whenever tank 962 is less than full (and optionally with some hysteresis).

Figure 13:
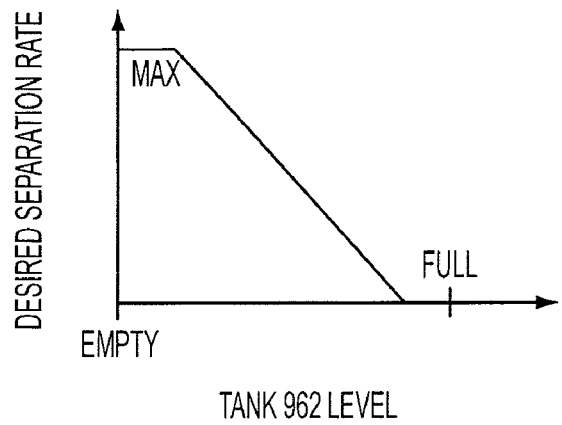
FIGS. 13, 14, and 15 show graphs of example parameter variation.
Figure 14:
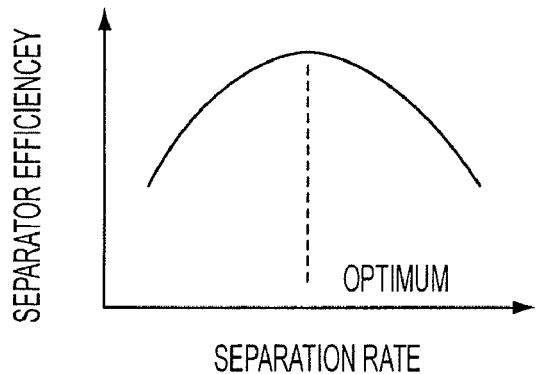
Figure 15:
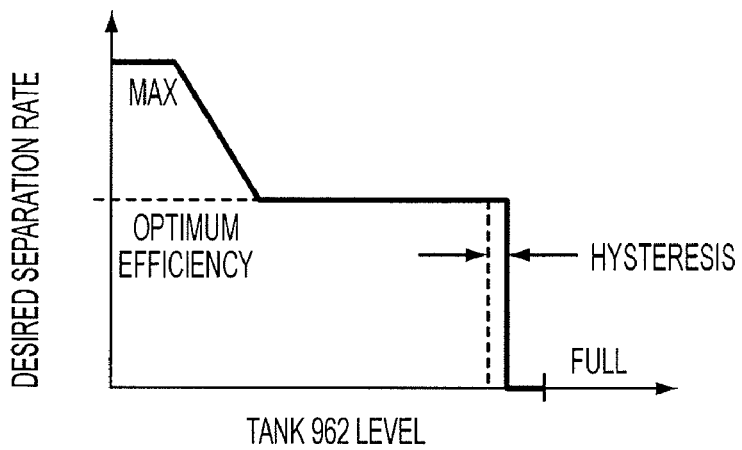

Alternatively, if parasitic losses are higher, and/or if separator efficiency is a function of separation rate, then additional control actions may be taken. For example, more sophisticated controls described below may be used to minimize the losses. Regardless of efficiency, the separator may be operated at maximum or increased separation rate whenever tank 962 is below a threshold value, which may be near empty. If parasitic losses are proportional to separation rate, then the separator may be controlled to make separation rate substantially inversely proportional to tank level, as shown in FIG. 13. If separator efficiency is maximum at some intermediate separation rate as shown in FIG. 14, the controls may maximize or increase time spent at or near that rate, as shown in FIG. 15. Further, combinations of the above controls may be used. Further still, the above control adjustments to separation rate may be translated into a feedback control routine for controlling fill level of one or more tanks by adjusting the separator and/or other operating parameters.

Returning to FIG. 12, in 1210 the routine determines or measures a current tank fill level of tank 962. Next, in 1212, the routine determines a demand rate of fuel from tank 962 based on operating conditions, including current and/or predicted conditions, for example. Then, in 1214, the routine adjusts separator operation based on a difference between a desired fill state (e.g., full, or partly filled) and the measured fill level, as well as based on the demand rate. In this way, it is possible to take into account both engine demand and tank fill conditions to provide sufficient and more efficient separation.

Figure 16:
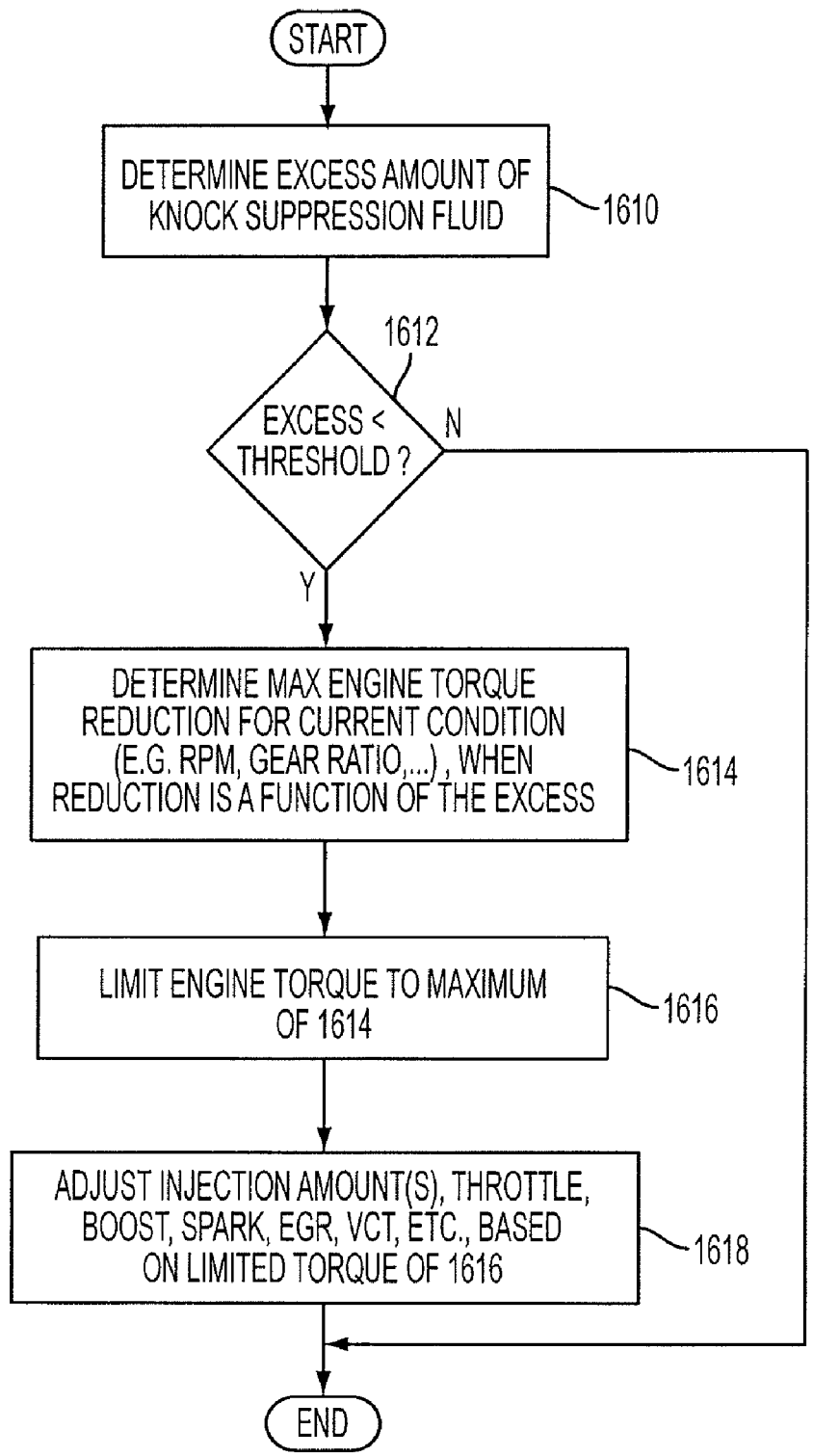
FIG. 16 shows an example routine for controlling engine and separator operation.

Referring now specifically to FIG. 16, a routine is described for adjusting engine output limits, and thus usage rate of a knock suppression fluid, based on an amount of storage of the knock suppression fluid, such as a level in tank 962, for example. Specifically, the routine adjusts operation to reduce sudden decreases in peak engine output caused by sudden unavailability of the knock suppression fluid (e.g., due to depletion).

Figure 17:
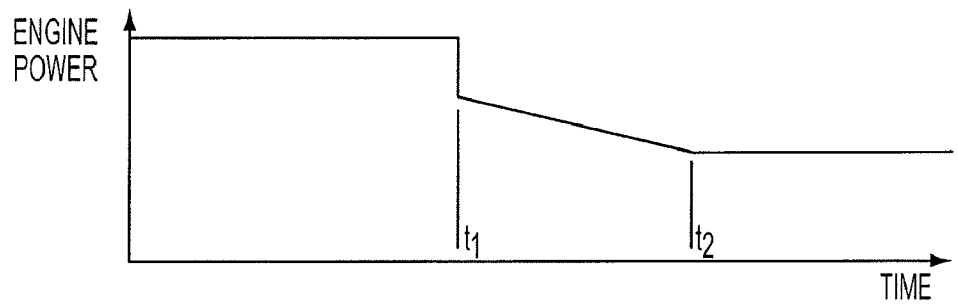
FIGS. 17-20 are graphs illustrating example operation with respect to FIG. 16.

In other words, as shown by the graph of FIG. 17, in the case of continuous high engine power demand, if a secondary fluid, such as a knock suppression fluid, is used indiscriminately, abrupt decreases in engine power may occur. For example, before time t1, sufficient knock suppression fluid is available and being used to enable operation at a high engine power. However, at time t1, the storage is depleted and the usage rate is limited by the separator rate (here it is assumed that the rate decreases due to a decrease in separator performance as the knock suppression substance in the tank is depleted). Then, at time t2, there is no substance to be separated left in the tank (e.g., 410, 710).

Figure 18:
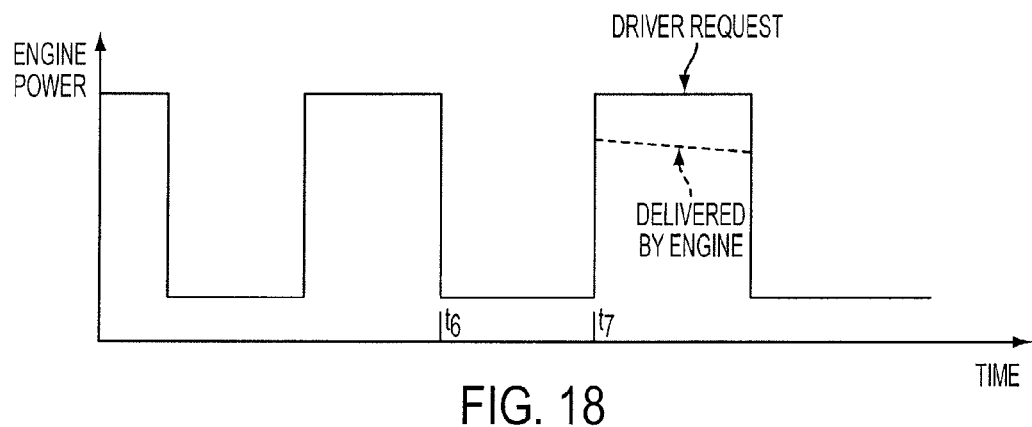

Likewise, in another example of intermittent high engine output demand, again the driver may experience an abrupt decrease in available engine output as illustrated in FIG. 18. This graph illustrates that at time t6, the knock suppression fuel is depleted, and thus at t7, the driver suddenly discovers a power loss. Specifically, before t6, the solid line indicating driver request and the dashed line indicated output delivered by the engine are aligned, whereas at t7, there may be a substantial difference.

In another embodiment, the routine adjusts engine operation (e.g., delivery of gasoline and a knock suppression fluid such as separated ethanol), based on the level of storage. Specifically, in 1610, the routine determines an excess amount of knock suppression fluid, such as an amount stored in a tank greater than a minimum level. Next, in 1612, the routine determines whether the excess is less than a threshold value in 1612. If not, the routine ends. Otherwise, the routine continues to 1614 to determine a maximum engine torque reduction for the current conditions, where the reduction may be a function of the excess. For example, the reduction may be proportional to the excess, where with a larger excess, the reduction is smaller and with a smaller excess, the reduction is greater. Further, the current conditions considered may include engine speed (RPM), gear ratio of a transmission, and others. Next, in 1616, the routine limits engine torque via the reduction of 1614, and then in 1618 the routine adjusts injection amount(s), throttle angle, boost amount, spark timing, exhaust gas recirculation amount, cam timing and/or valve timing, and others based on the limited torque value of 1616.

Figure 19:
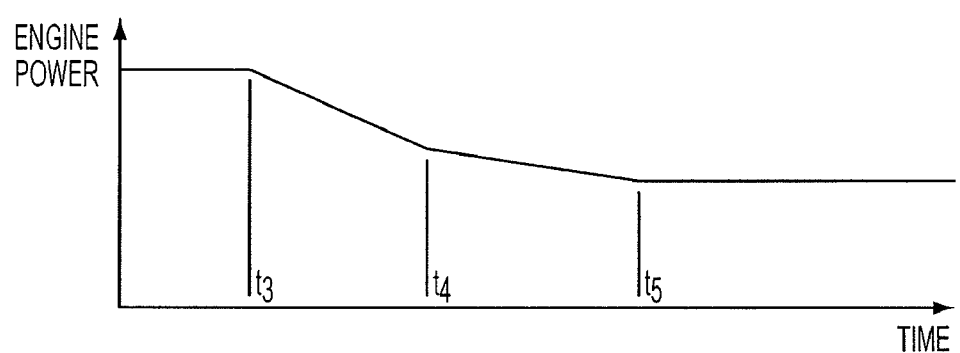
Figure 20:
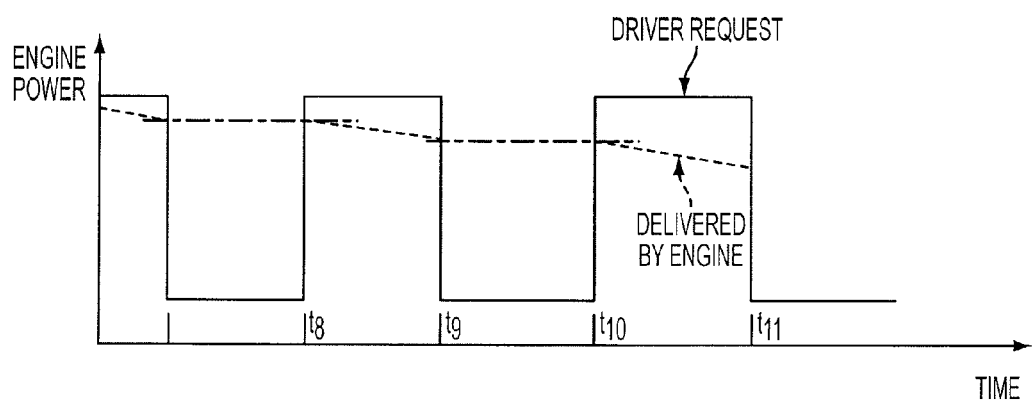

In this way, a gradual reduction in engine output and vehicle performance can be provided, thus reducing abrupt changes that may be more objectionable to a vehicle operator. For example, as shown in FIG. 19 (which shows an example similar to that of FIG. 17), full output may be provided up to time t3, and then it may be more gradually reduced to time t4 before emptying storage of a knock suppression fluid, where time t4 is generally longer than t1 of FIG. 17. Again, after t4, the separator capability dictates usage rates until t5 when there is no substance to be separated left in the tank. Likewise, FIG. 20 shows a graph similar to FIG. 18, but using a control routine to provide gradual power decrease over a plurality of intermittent high power output requests. Specifically, between each of t8 and t9, and t10 and t11, a gradual decrease is provided. Further, the dash dot lines illustrates that the driver is able to return to a peak torque or power near that previously provided.

Figure 21:
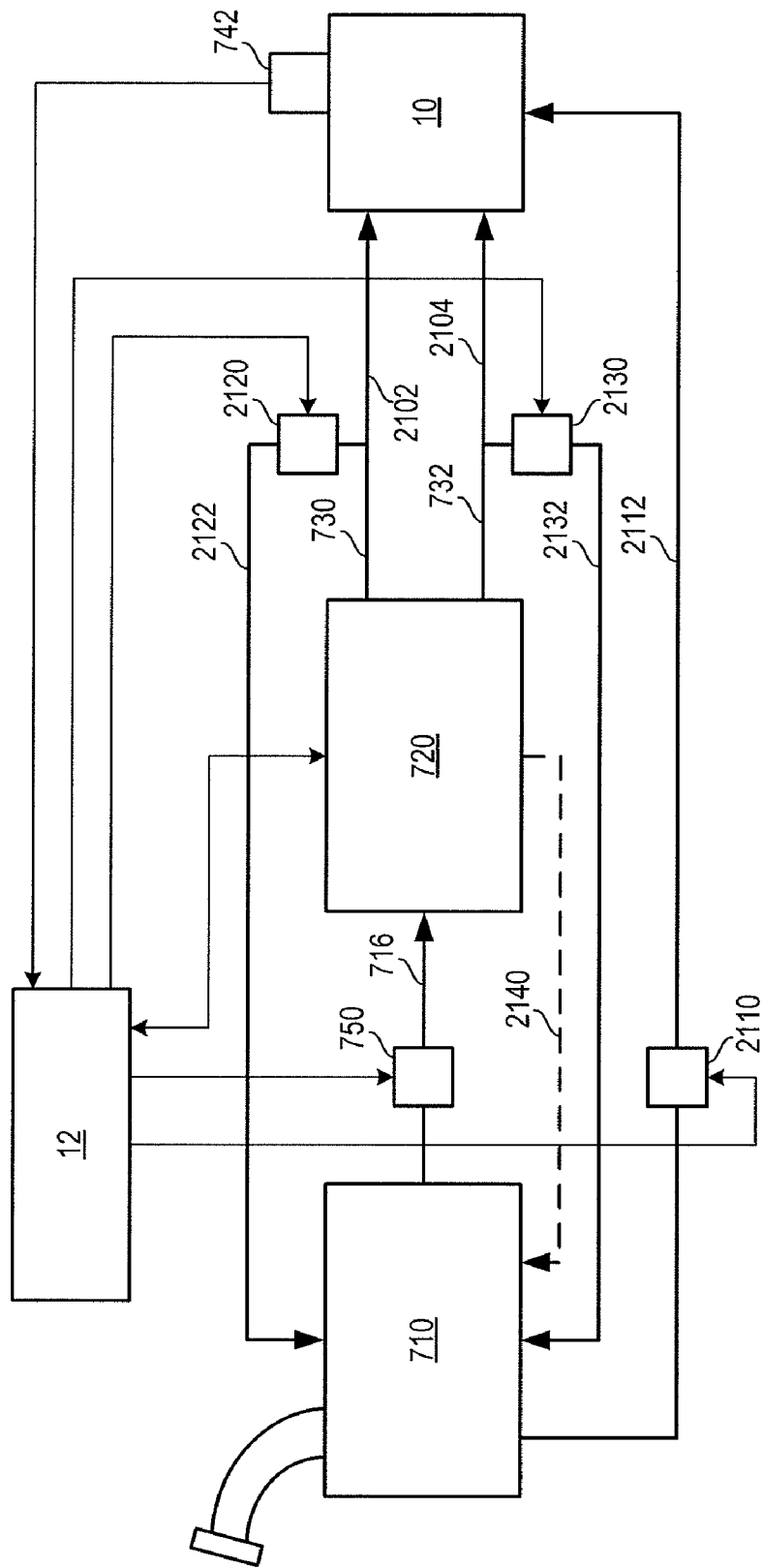
FIG. 21 shows an alternative fuel system layout.

FIG. 21 provides another embodiment of a fuel system for engine 10. The fuel system of FIG. 21 includes many of the previously described components, including fuel tank 710 where a fuel mixture may be initially received, a fuel pump 750, a fuel separator 720, and a controller 12. Fuel pump 750 may be operated to supply pressurized fuel mixture 716 to fuel separator 720, thereby creating a first fuel mixture (i.e. first separated fuel) 732 and a second fuel mixture (i.e. second separated fuel) 730. As previously described, fuel mixtures 730 and 732 may include different fuel compositions. For example, fuel mixture 732 may include a higher concentration of alcohol than fuel mixture 730. In the context of ethanol, the fuel mixture 732 may be referred to as an ethanol rich fuel and fuel mixture 730 may be referred to as an ethanol depleted fuel.

These two separated fuels may be provided to the engine in varying relative amounts in response to operating conditions, such as engine load, to reduce engine knock. First separated fuel 732 may be delivered to the engine via fuel passage 2104, while second separated fuel 730 may be delivered to the engine via fuel passage 2102. Fuel separator 720 may include an optional fuel return passage 2140 as previously described with reference to 734. In some embodiments, fuel passage 2104 may be fluidly coupled with one or more direct fuel injectors of the engine and fuel passage 2102 may be fluidly coupled with one or more port fuel injectors of the engine. In this way, first separated fuel 732 (including a higher alcohol concentration than second separated fuel 730) may be delivered to the engine via one or more direct fuel injectors while second separated fuel 730 may be delivered to the engine via one or more port fuel injectors.

Fuel passage 2104 may communicate with fuel return passage 2132 via a valve 2130. In some embodiments, valve 2130 may be actively controlled by controller 12 in order vary the amount of first separated fuel 732 that is returned to fuel tank 710 via fuel return passage 2132. In other embodiments, valve 2130 may be passively controlled without necessarily receiving input from controller 12. For example, valve 2130 may comprise a fuel pressure regulator that is configured to open to increase fuel flow returned to the fuel tank via passage 2132 when the pressure of the first separated fuel exceeds a first threshold pressure within fuel passage 2104.

Fuel passage 2102 may communicate with fuel return passage 2122 via valve 2120. In some embodiments, valve 2120 may be actively controlled by controller 12 in order to vary the amount of the second separated fuel 732 that is returned to fuel tank 710 via fuel return passage 2122. In other embodiments, valve 2120 may be passively controlled without necessarily receiving input from controller 12. For example, valve 2120 may comprise a fuel pressure regulator that is configured to open to increase fuel flow returned to the fuel tank via passage 2122 when the pressure of the second separated fuel exceeds a second threshold pressure within fuel passage 2102.

In some embodiments, a pressure relief setting of valve 2120 may be set to a different level than a pressure relief setting of valve 2130. For example, valve 2130 may configured to open at higher fuel pressures than valve 2120. For example, the first threshold pressure may be higher than the second threshold pressure in the above example. In this way, first separated fuel 732 may be provided to the direct fuel injectors at a higher pressure and second separated fuel 730 may be provided to the port fuel injectors at a lower pressure.

In some embodiments, the fuel mixture stored at fuel tank 710 may be provided to engine 10 via fuel passage 2112 without first undergoing separation at fuel separator 720. Fuel passage 2112 may include a fuel pump 2110, which may be controlled by controller 12. Fuel passage 2112 may be fluidly coupled with the port fuel injectors of engine 10. For example, fuel passages 2102 and 2112 may each supply fuel to the same port fuel injectors. In some embodiments, fuel passage 2112 may be fluidly coupled with fuel passage 2102 at a location that is fluidly disposed between the engine and the fuel separator.

Figure 22:
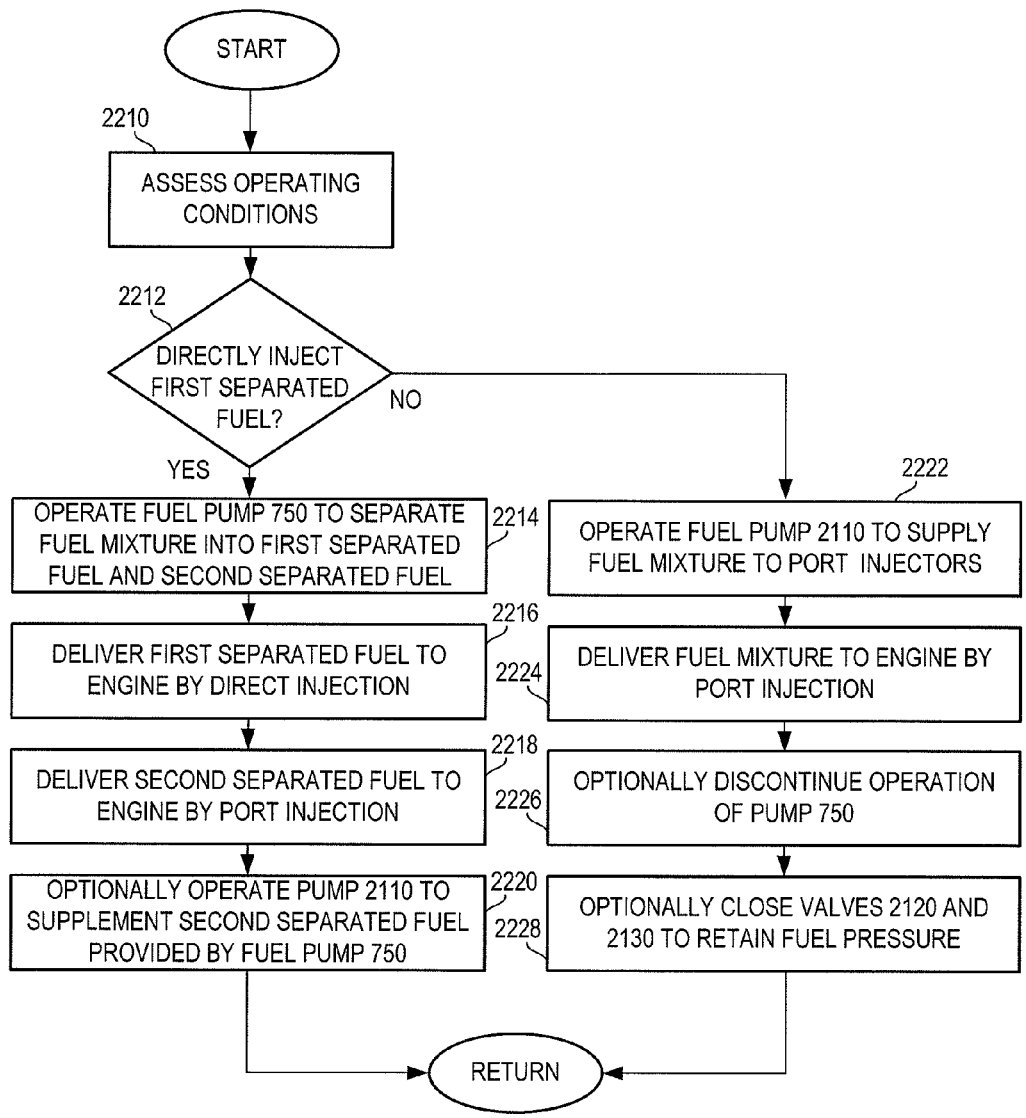
FIGS. 22-24 show fuel separator control routines.

FIG. 22 illustrates an example control routine that may be performed with the fuel system of FIG. 21. At 2210, operating conditions may be assessed by the controller. As a non-limiting example, the controller may identify the engine load, engine speed, whether an indication of engine knock is present (e.g. via a knock sensor), the respective fuel usage rates of the separated fuels and the fuel mixture by the engine, fuel pressure of each of the separated fuels and the fuel mixture, fuel separator conditions, etc. As will be described with reference to FIGS. 22, 23, and 24, valves 2120 and 2130, and fuel pumps 750 and 2110 may be operated in response to one or more of these operating conditions to vary the relative amount of each fuel that is supplied to the engine and vary the relative amount of each fuel that is returned to the fuel tank after undergoing separation at the fuel separator.

At 2212, it may be judged whether first separated fuel 732 is to be directly injected at engine 10. As previously described, direct injection of a higher alcohol concentration fuel may be used to a greater extent at higher loads relative to port injection of the lower alcohol concentration fuels in order to reduce engine knock. As such, the answer at 2212 may be judged with respect to engine load in some examples.

If the answer at 2212 is judged yes, the routine may proceed to 2214. At 2214, fuel pump 750 may be operated to cause pressurized fuel mixture 716 to be separated at fuel separator 720 into first separated fuel 732 and second separated fuel 730. As a non-limiting example, fuel pump 750 may comprise an electric fuel pump, whereby the controller may be configured to vary a level of electrical energy supplied to fuel pump 750 to adjust a level of pump work provided by fuel pump 750.

At 2216, first separated fuel 732 may be delivered to the engine via direct injection and second separated fuel 730 may be delivered to the engine via port injection as indicated at 2218. At 2220, fuel pump 2110 may be optionally operated by controller 12 to supplement the second separated fuel with the fuel mixture supplied to the engine via fuel passage 2112. For example, each of the second separated fuel provided to the engine via fuel pump 750 and the fuel mixture provided to the engine via fuel pump 2110 may be delivered to the engine via the same port fuel injectors.

If the answer at 2212 is alternatively judged no (i.e. the first separated fuel is not to be directly injected at the engine) the routine may proceed to 2222. At 2222, fuel pump 2110 may be operated by controller 12 to supply the fuel mixture from fuel tank 710 to the port fuel injectors of the engine via fuel passage 2112. At 2224, the fuel mixture may be delivered to the engine via the port fuel injectors. At 2226, operation of pump 750 may be optionally discontinued while pump 2110 is operated to supply the fuel mixture to the engine from fuel tank 710. For example, controller 12 may reduce or discontinue the supply of electrical energy to fuel pump 750. In other embodiments, where fuel pump 750 is powered mechanically by the engine, fuel pump 750 may be clutched or disengaged from the mechanical coupling with the engine. By discontinuing operation of pump 750 under select conditions (e.g. such as lower engine loads where direct injection of the higher alcohol concentration fuel is not utilized), efficiency of the fuel system may be increased.

At 2228, valves 2120 and/or 2130 may be optionally closed to retain fuel pressure within respective fuel passages 2102 and 2104, particularly where operation of fuel pump 750 is discontinued. In this way, pressurized fuel may be retained for delivery to the engine when direct injection of the first separated fuel is once again utilized by the engine. Alternatively, fuel pump 750 may be operated to continue separation of the fuel mixture at fuel separator 720, whereby the second separated fuel may be delivered to the engine via the port fuel injectors while the first separated fuel having the higher alcohol concentration may be returned to the engine via fuel return passage 2132 by opening valve 2130. In this example, fuel pump 2110 may be optionally deactivated since the second separated fuel may be available for injection at the engine by the port fuel injectors, or fuel pump 2110 may be operated to supplement the second separated fuel with the fuel mixture supplied via fuel passage 2112.

In this way, FIG. 22 depicts a method of operating a fuel system for an engine of a vehicle, comprising: receiving a fuel mixture, said fuel mixture having at least some alcohol; separating said fuel mixture into at least a first separated fuel and second separated fuel on-board the vehicle, where said first separated fuel has a higher alcohol concentration than said second separated fuel; varying an operating parameter of the separation in response to an operating condition; delivering a first amount of said first separated fuel and a second amount of said second separated fuel to the engine in different ratios; and returning a third amount of said first separated fuel and a fourth amount of said second separated fuel to the fuel tank in different ratios. As such, the different ratios of the first amount of said first separated fuel and a second amount of said second separated fuel supplied to the engine may be varied responsive to the operating condition, which may include engine load and/or an indication of engine knock. The different ratios of the third amount of said first separated fuel and a fourth amount of said second separated fuel returned to the fuel tank may be varied responsive to the operating condition(s).

Figure 23:
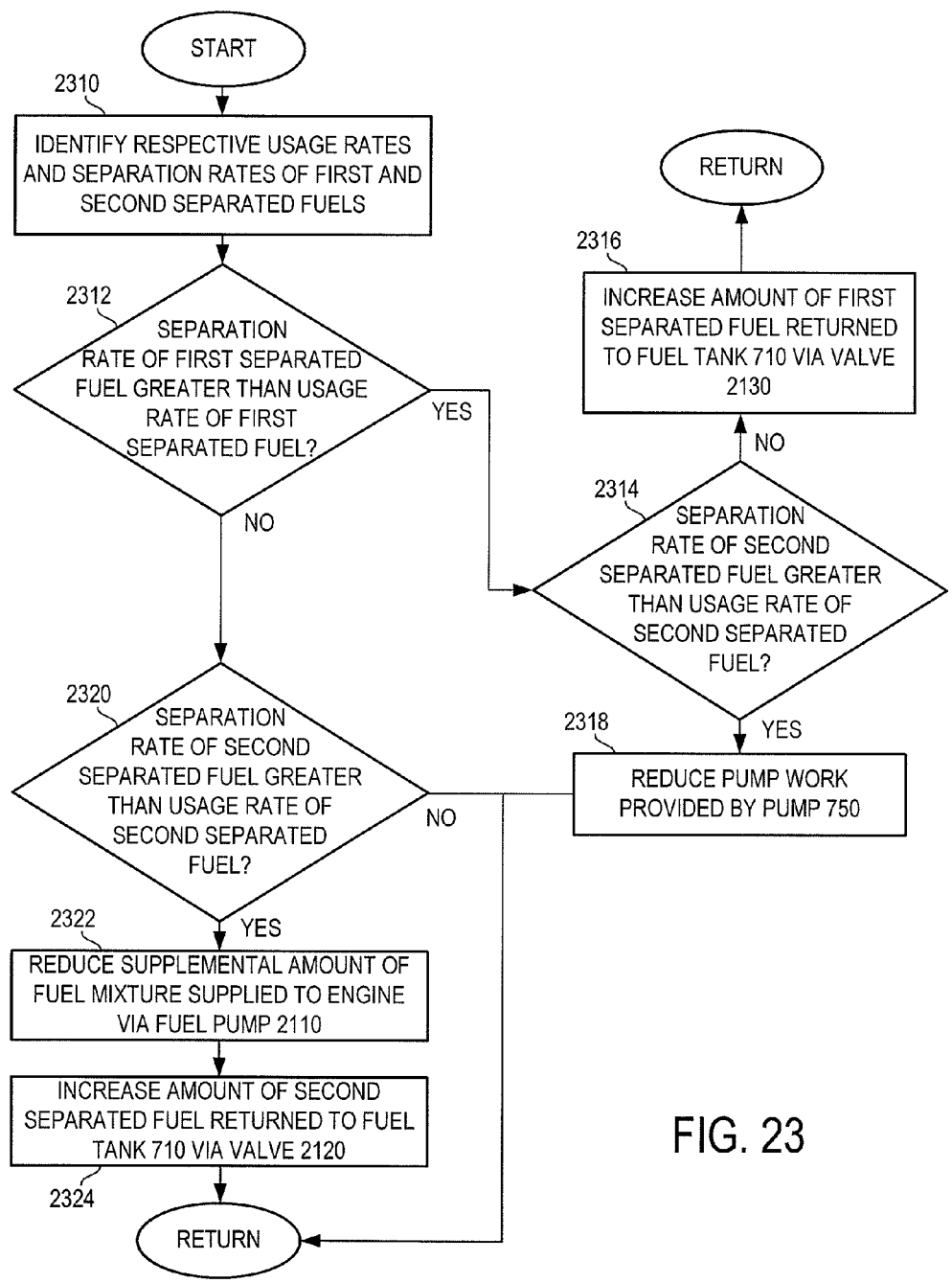
Figure 24:
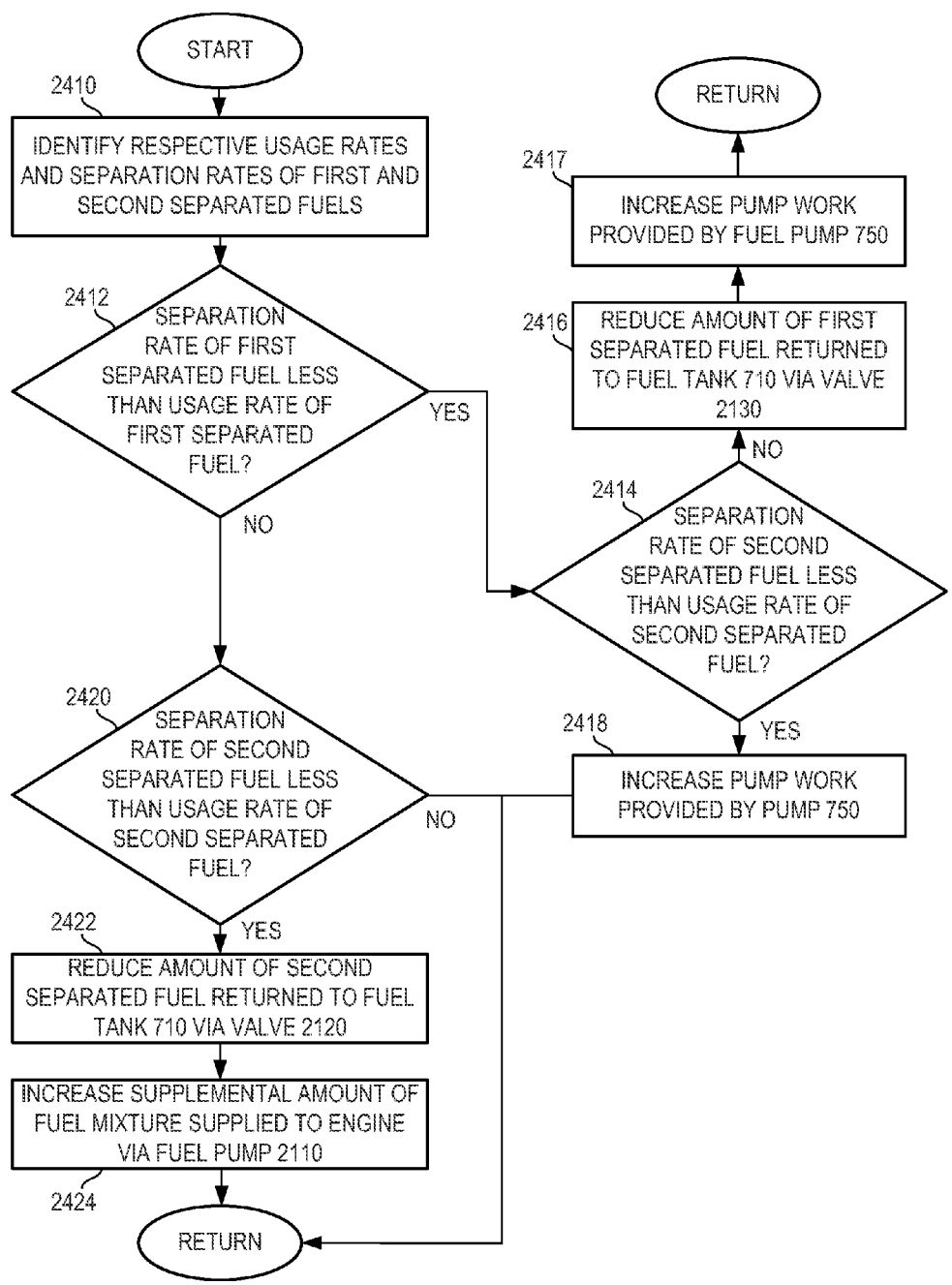

FIGS. 23 and 24 illustrate example control routines that may be performed with the fuel system of FIG. 21 to control fuel pumps 750 and 2110, and valves 2120 and 2130. At 2310, the respective usage rates by the engine and separation rates of the first separated fuel and the second separated fuel may be identified. In some embodiments, controller 12 may infer fuel usage rates based on an indication of fuel pressure within fuel passages 2102 and 2104. In other embodiments, controller 12 may infer fuel usage rates from fuel injector pulse widths and exhaust gas oxygen sensor feedback. In some embodiments, fuel flow rate sensors may be utilized by controller 12. In some embodiments, the controller may set the usage rate of each fuel at the engine in response to operating conditions such as engine load and/or an indication of engine knock.

At 2312, it may be judged whether the separation rate of the first separated fuel is greater than the usage rate of the first separated fuel at the engine. In some embodiments, the difference between the separation rate of the first separated fuel and the usage rate of the first separated fuel may be judged in response to feedback received from a fuel pressure sensor that is configured to identify the pressure at which the first separated fuel is supplied to the direct fuel injectors of the engine. For example, where the pressure of the first separated fuel within fuel passage 2104 exceeds a threshold value or is increasing, controller 12 may judge that the separation rate is greater than the usage rate of the first separated fuel. Conversely, where the pressure of the first separated fuel does not exceed the threshold value or is decreasing, controller 12 may judge that the separation rate is not greater than the usage rate or is less than the usage rate. This fuel pressure sensor may be arranged along fuel passage 2104 or fuel passage 2132 in some embodiments. For example, valve 2130 may include the fuel pressure sensor. As another example, this fuel pressure sensor may be arranged at a fuel rail of the direct fuel injectors which are fluidly coupled with fuel passage 2104.

If the answer at 2312 is judged yes, the routine may proceed to 2314. At 2314, it may be judged whether the separation rate of the second separated fuel is greater than the usage rate of the second separated fuel at the engine. As described with reference to the first separated fuel, the difference between the separation rate and the usage rate of the second separated fuel may be judged responsive to feedback received from a fuel pressure sensor. For example, a second fuel pressure sensor may be configured to identify the pressure at which the second separated fuel is supplied to the port fuel injectors of the engine. Where the pressure of the second separated fuel exceeds a threshold or is increasing, it may be judged that the separation rate exceeds the usage rate of the second separated fuel. Conversely, where the pressure of the second separated fuel does not exceed the threshold or is decreasing, it may be judged that the separation rate does not exceed the usage rate or is less than the usage rate. In some embodiments, this second fuel pressure sensor may be arranged along fuel passage 2102 or fuel passage 2122, such as at valve 2120. As another example, this fuel pressure sensor may be arranged at a fuel rail of the port fuel injectors which are fluidly coupled with fuel passage 2102.

If the answer at 2314 is judged yes, the routine may proceed to 2318 where pump work provided by fuel pump 750 may be reduced. By reducing the pump work provided by fuel pump 750, the separation rate of both the first separated fuel and the second separated fuel at fuel separator 720 may be reduced. In this way, where the separation rate of both fuels exceeds their usage rates at the engine, the pump work provided by fuel pump 750 may be reduced to increase the operating efficiency of the fuel system. In some embodiments, fuel pump 750 may be deactivated, for example, as described with reference to operation 2226 of FIG. 22.

Alternatively, if the answer at 2314 is judged no (i.e. the separation rate of the second separated fuel does not exceed the usage rate of the second separated fuel), the routine may proceed to 2316. At 2316, the amount of the first separated fuel that is returned to fuel tank 710 via valve 2130 may be increased. As a first example, valve 2130 may be configured as a pressure relief valve that limits the pressure of the first separated fuel within fuel passage 2104 to less than a threshold valve or pressure relief setting. As a second example, valve 2130 may be actively controlled by controller 12 in response to feedback from a pressure sensor that is configured to sense the pressure of the first separated fuel. In this way, valve 2130 may be opened to reduce the pressure at which the first separated fuel is supplied to the engine.

Returning to 2312, if the answer is alternatively judged no (i.e. the separation rate of the first separated fuel is not greater than the usage rate of the first separated fuel), the routine may proceed to 2320. At 2320, it may be judged whether the separation rate of the second separated fuel is greater than the usage rate of the second separated fuel at the engine. The answer at 2320 may be judged from feedback received from a pressure sensor as described with reference to operation 2314. If the answer at 2320 is judged no, the routine may return. Alternatively, if the answer at 2320 is judged yes, the routine may proceed to 2322.

At 2322, the supplemental amount of the fuel mixture supplied to the port fuel injectors of the engine from fuel tank 710 via fuel pump 2110 may be reduced so that the usage rate of the second separated fuel by the port fuel injectors of the engine may be proportionally increased. For example, at 2322, the pump work provided by fuel pump 2110 may be reduced responsive to the extent to which the pressure of the second separated fuel exceeds the threshold value. As an alternative to the operation at 2322 or in addition to the operation at 2322, the amount of the second separated fuel that is returned to fuel tank 710 via valve 2120 may be increased. For example, valve 2120 may be opened to reduce the pressure of the separated second fuel. In some embodiments, the operation at 2322 may be preferred to the operation at 2324, since reduction of the pump work provided by fuel pump 2110 may serve to further increase efficiency of the fuel system.

FIG. 24 illustrates a control routine that is similar in some respects to the routine of FIG. 23, except that the separation rates of the first and second separated fuels are instead maintained above their respective usage rates at the engine. At 2410, the usage rates and separation rates of the first and second separated fuels may be identified, for example, as previously described with reference to operation 2310 of FIG. 23. At 2412 and 2414, it may be judged whether the separation rate of the first and second separated fuels are less than the respective usage rates of the first and second separated fuels. If the answers at both 2412 and 2414 are judged yes, the pump work provided by fuel pump 750 may be increased at 2418 to increase the separation rate of the first and second separated fuels. Alternatively or additionally, the controller may increase the separation rate at fuel separator 720 using one or more of the approaches that were previously described with reference to FIGS. 1-20.

If the answer at 2414 is judged no (i.e. the separation rate of the second separated fuel is not less than the usage rate of the second separated fuel at the engine), then the routine may proceed to 2416. At 2416, the amount of the first separated fuel that is returned to fuel tank 710 via valve 2130 may be reduced. For example, valve 2130 may be closed or the opening of the valve may be reduced. At 2417, the pump work provided by fuel pump 750 may be optionally increased in order to increase the separation rate of the first separated fuel as an alternative to or in addition to the operation at 2416. For example, where valve 2130 is fully closed, the pump work provided by fuel pump 750 may be increased.

If the answer at 2412 is judged no, the routine may proceed to 2420. At 2420, it may be judged whether the separation rate of the second separated fuel is less than the usage rate of the second separated fuel. If the answer at 2420 is judged no, the routine may return. Alternatively, if the answer at 2420 is judged yes, the amount of the second separated fuel that is returned to fuel tank 710 via valve 2120 may be reduced. For example, valve 2120 may be closed or the opening of the valve may be reduced. At 2424, the supplemental amount of the fuel mixture that is supplied to the port fuel injectors of the engine via fuel pump 2110 may be increased. For example, the pump work provided by fuel pump 2110 may be increased in order to increase the amount of second separated fuel that is supplemented by the fuel mixture supplied from fuel tank 710.

As described above, a control system including controller 12 may be configured to operate a first fuel injector group (e.g. one or more direct fuel injectors) and a second fuel injector group (e.g. one or more port fuel injectors) to deliver a first separated fuel and a second separated fuel to the engine in different ratios responsive to an operating condition, including engine load and/or an indication of engine knock. As described with reference to FIGS. 22-24, the control system may be configured to adjust valves 2120 and 2130 responsive to the operating conditions, including engine load and an indication of engine knock. For example, the controller may be configured to adjust one or both of valves 2120 and 2130 so that a pressure at which the first separated fuel is supplied to the first injector group is greater than a pressure at which the second separated fuel supplied to the second injector group. Furthermore, a fuel passage (e.g. 2112) bypassing the fuel separator and fluidly coupling the fuel tank to the second fuel injector group may be provided, where the controller is further configured to vary a ratio of the second separated fuel and the fuel mixture that is supplied to the second fuel injector group responsive to the operating condition (e.g. engine load and/or an indication of engine knock) by adjusting one or more of valve 2120 or fuel pump 2110.

It will be appreciated that the configurations, systems, and routines disclosed herein are exemplary in nature, and that these specific embodiments are not to be considered in a limiting sense, because numerous variations are possible. For example, the above approaches can be applied to V-6, I-3, I-4, I-5, I-6, V-8, V-10, V-12, opposed 4, and other engine types.

As another example, engine 10 may be a variable displacement engine in which some cylinders (e.g., half) are deactivated by deactivating intake and exhaust valves for those cylinders. In this way, improved fuel economy may be achieved. However, as noted herein, in one example injection using multiple types of fuel delivery (e.g., fuel composition or delivery location) can be used to reduce a tendency of knock at higher loads. Thus, by operating for example with direct injection of water and/or a fuel containing alcohol (such as ethanol or an ethanol blend) during cylinder deactivation operation, it may be possible to extend a range of cylinder deactivation, thereby further improving fuel economy.

As will be appreciated by one of ordinary skill in the art, the specific routines described herein in the flowcharts and the specification may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12. Further still, while the various routines may show a "start" and "end" block, the routines may be repeatedly performed in an iterative manner, for example.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel system for an engine of a vehicle, comprising:
   a fuel tank configured to receive a fuel mixture, said mixture having at least some alcohol;
   a fuel separator configured to separate the fuel mixture received at a separator inlet passage into a first separated fuel at a first separator outlet passage and a second separated fuel at a second separator outlet passage, where the first separated fuel has a higher alcohol concentration than the second separated fuel, the separator inlet passage fluidly coupled to the fuel tank, the first separator outlet passage fluidly coupled to a first fuel injector group of the engine, the second separator outlet passage fluidly coupled to a second fuel injector group of the engine;
   a first fuel return passage fluidly coupling the first separator outlet passage to the fuel tank via a first valve;
   a second fuel return passage fluidly coupling the second separator outlet passage to the fuel tank via a second valve; and
   a control system configured to operate the first fuel injector group and the second fuel injector group to deliver the first separated fuel and the second separated fuel to the engine in different ratios responsive to an engine operating condition, where the control system is further configured to vary an amount of each fuel returned to the fuel tank via the first valve and the second valve in response to a separation rate of fuel and responsive to at least one of engine speed, engine load, and engine knock, and where the engine operating condition includes an indication of engine knock, and where the fuel system further includes a third fuel return passage from the fuel separator to the fuel tank, the third fuel return passage a fuel return passage for ethanol.

2. The fuel system of claim 1, where the control system is further configured to decrease pump work when a separation rate of the first separated fuel is greater than a usage rate of the first separated fuel at the engine.

3. The fuel system of claim 1, where the engine operating condition includes engine load, and where the control system is further configured to deliver a mixture comprising the fuel mixture from the fuel tank and the second separated fuel via the second fuel injector group.

4. The fuel system of claim 1, where the control system is further configured to determine a difference between the separation rate of fuel and a usage rate of fuel.

5. The fuel system of claim 1, where the control system is configured to adjust the first valve and the second valve so that a pressure at which the first separated fuel is supplied to the first injector group is greater than a pressure at which the second separated fuel is supplied to the second injector group.

6. The fuel system of claim 5, where the first injector group includes one or more direct fuel injectors and the second injector group includes one or more port fuel injectors, and where the control system is further configured to adjust the fuel separation rate of the fuel separator to deliver the first separated fuel and a mixture comprising the second separated fuel and the fuel mixture, the mixture supplied to the second fuel injector group.

7. The fuel system of claim 1, where the first valve includes a first pressure relief valve having a higher pressure relief setting; and where the second valve includes a second pressure relief valve having a lower pressure setting, and where the control system is further configured to enable fuel separator operation in response to a battery state of charge above a threshold value.

8. The fuel system of claim 1, further comprising a fuel passage bypassing the fuel separator and fluidly coupling the fuel tank to the second fuel injector group; and where the control system is further configured to vary a ratio of the second separated fuel and the fuel mixture that is supplied to the second fuel injector group responsive to the engine operating condition by adjusting the second valve.

9. The fuel system of claim 8, further comprising a first fuel pump supplying the fuel mixture to the fuel separator and a second fuel pump arranged along the fuel passage between the fuel tank and the second fuel injector group, where the control system is further configured to vary a level of pump work provided by the second fuel pump responsive to the engine operating condition.

10. The fuel system of claim 1, further comprising a fuel pump arranged along the separator inlet passage between the fuel tank and the fuel separator;

and where the control system is further configured to vary a level of pump work provided by the fuel pump responsive to the engine operating condition.

11. An engine system for a vehicle, comprising:

an engine including at least a combustion chamber;

a fuel tank configured to receive a fuel mixture, said mixture having at least some ethanol;

a fuel separator configured to separate the fuel mixture received at a separator inlet passage into an ethanol rich fuel at a first separator outlet passage and an ethanol depleted fuel at a second separator outlet passage, the separator inlet passage in fluidic communication with the fuel tank, the first separator outlet passage in fluidic communication with a direct fuel injector of the combustion chamber, the second separator outlet passage in fluidic communication with a port fuel injector of the combustion chamber;

a first fuel return passage providing fluidic communication between the first separator outlet passage and the fuel tank via a first valve;

a second fuel return passage providing fluidic communication between the second separator outlet passage and the fuel tank via a second valve;

a third fuel return passage that provides fluidic communication between the fuel separator and the fuel tank; and a control system configured to:

reduce first fuel pump work based on a pressure indicative of a difference between a fuel separation rate and a fuel usage rate; and return a fuel to the fuel tank via the third fuel return passage.

* * * * *